(12) United States Patent
Hayama

(10) Patent No.: US 11,506,104 B2
(45) Date of Patent: Nov. 22, 2022

(54) EXHAUST STRUCTURE FOR SADDLE RIDING VEHICLE

(71) Applicant: HONDA MOTOR CO., LTD., Tokyo (JP)

(72) Inventor: Yoshitaka Hayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 311 days.

(21) Appl. No.: 16/704,759

(22) Filed: Dec. 5, 2019

(65) Prior Publication Data

US 2020/0271042 A1    Aug. 27, 2020

(30) Foreign Application Priority Data

Feb. 25, 2019 (JP) .............................. JP2019-031516
Feb. 25, 2019 (JP) .............................. JP2019-031517

(51) Int. Cl.
  *F01N 13/00*  (2010.01)
  *F01N 3/28*   (2006.01)
  (Continued)

(52) U.S. Cl.
  CPC ........... *F01N 13/002* (2013.01); *F01N 1/089* (2013.01); *F01N 3/28* (2013.01); *F01N 3/2842* (2013.01); *F01N 3/2892* (2013.01); *F01N 13/085* (2013.01); *F01N 13/1805* (2013.01); *F01N 13/1844* (2013.01); *F01N 13/082* (2013.01);
  (Continued)

(58) Field of Classification Search
  CPC ......... F01N 13/002; F01N 1/089; F01N 3/28; F01N 3/2842; F01N 3/2892; F01N 13/085; F01N 13/1805; F01N 13/1844; F01N 13/082; F01N 13/10; F01N 2260/18;
  (Continued)

(56) References Cited

U.S. PATENT DOCUMENTS 7,509,800 B2  3/2009  I et al.
2008/0110162 A1*  5/2008  Arai ............... F01N 13/08
                                                60/323

FOREIGN PATENT DOCUMENTS

JP    S56-124222    9/1981
JP    S56-138415    10/1981
(Continued)

OTHER PUBLICATIONS

Chinese Office Action dated Jul. 5, 2021, English translation included, 22 pages.
(Continued)

Primary Examiner — Mickey H France
(74) Attorney, Agent, or Firm — Rankin, Hill & Clark LLP

(57) ABSTRACT

An exhaust structure for a saddle riding vehicle includes: an exhaust pipe connected to an internal combustion engine; and a catalyst disposed in the exhaust pipe; the exhaust pipe including a catalyst case unit housing the catalyst and upstream side exhaust pipes disposed on an upstream side of the catalyst case unit; the catalyst case unit having a larger diameter than the upstream side exhaust pipes; the upstream side exhaust pipes being connected to the catalyst case unit in a connecting portion located on an upstream side of the catalyst in a flow of exhaust; in the connecting portion, axes of the upstream side exhaust pipes and an axis of the catalyst case unit being in substantially right-angled positional relation to each other.

18 Claims, 14 Drawing Sheets

(51) Int. Cl.
  *F01N 1/08*   (2006.01)
  *F01N 13/08*  (2010.01)
  *F01N 13/18*  (2010.01)
  *F01N 13/10*  (2010.01)
(52) U.S. Cl.
  CPC .......... *F01N 13/10* (2013.01); *F01N 2260/18* (2013.01); *F01N 2340/04* (2013.01); *F01N 2450/22* (2013.01); *F01N 2470/16* (2013.01); *F01N 2590/04* (2013.01)
(58) Field of Classification Search
  CPC ............. F01N 2340/04; F01N 2450/22; F01N 2470/16; F01N 2590/04
  See application file for complete search history.

(56) References Cited

FOREIGN PATENT DOCUMENTS

| JP | S60-17220 | 1/1985 |
|---|---|---|
| JP | H07-224648 | 8/1995 |
| JP | 2008-133823 | 6/2008 |
| JP | 2012-121418 | 6/2012 |
| JP | 2014-095348 | 5/2014 |
| JP | 2015-224598 | 12/2015 |
| JP | 2016-183652 | 10/2016 |
| KR | 10-2004-0000081 A | 1/2004 |
| WO | 2018/030110 A1 | 3/2019 |

OTHER PUBLICATIONS

Indian Office Action dated Mar. 11, 2021, 5 pages.
Japanese Office Action dated Nov. 10, 2020 in corresponding Japanese application JP 2019-031516, English translation included, 12 pages.
Japanese Office Action dated Nov. 10, 2020 in corresponding Japanese application JP 2019-031517, English translation included, 11 pages.

\* cited by examiner

US 11,506,104 B2

EXHAUST STRUCTURE FOR SADDLE RIDING VEHICLE

INCORPORATION BY REFERENCE

The present application claims priority under 35 U.S.C. § 119 to Japanese Patent Application No. 2019-031516 filed on Feb. 25, 2019 and Japanese Patent Application No. 2019-031517 filed on Feb. 25, 2019. The content of the applications is incorporated herein by reference in its entirety.

TECHNICAL FIELD

The present invention relates to an exhaust structure for a saddle riding vehicle.

BACKGROUND ART

Conventionally, an exhaust structure for a saddle riding vehicle is known which includes an exhaust pipe connected to an internal combustion engine and a catalyst disposed in the exhaust pipe (see Patent Document 1, for example). In Patent Document 1, in a part on an upstream side of a tubular portion housing the catalyst in the exhaust pipe including the catalyst, another exhaust pipe merges with the above-described exhaust pipe so as to be substantially orthogonal to the above-described exhaust pipe. This merging part is in a position distant from the catalyst, and in the vicinity of the catalyst, exhaust flows in an axial direction of the exhaust pipe.

PRIOR ART DOCUMENT

Patent Document

[Patent Document 1]
Japanese Patent Laid-Open No. Sho 60-17220

SUMMARY OF THE INVENTION

Problem to be Solved by the Invention

In the exhaust structure for a saddle riding vehicle, in order to make the catalyst function efficiently, the exhaust is desirably fed to the catalyst as uniformly as possible.

The present invention has been made in view of the above-described circumstances, and it is an object of the present invention to be able to feed exhaust to a catalyst uniformly in an exhaust structure for a saddle riding vehicle.

Means for Solving the Problem

An exhaust structure for a saddle riding vehicle includes: an exhaust pipe (33) connected to an internal combustion engine (11); and a catalyst (52) disposed in the exhaust pipe (33); the exhaust pipe (33) including a catalyst case unit (51) housing the catalyst (52) and an upstream side exhaust pipe (50L, 50R) disposed on an upstream side of the catalyst case unit (51); the catalyst case unit (51) having a larger diameter than the upstream side exhaust pipe (50L, 50R); the upstream side exhaust pipe (50L, 50R) being connected to the catalyst case unit (51) in a connecting portion (60) located on an upstream side of the catalyst (52) in a flow of exhaust; in the connecting portion (60), an axis (50L1, 50R1) of the upstream side exhaust pipe (50L, 50R) and an axis (51a) of the catalyst case unit (51) being in substantially right-angled positional relation to each other.

In addition, in the above-described constitution, a plurality of the upstream side exhaust pipes (50L, 50R) may be connected to the catalyst case unit (51) in the connecting portion (60).

In addition, in the above-described constitution, the plurality of upstream side exhaust pipes (50L, 50R) may be arranged alongside and substantially in parallel with each other in the connecting portion (60).

Further, in the above-described constitution, the plurality of upstream side exhaust pipes (50L, 50R) may include inward extending pipe portions (61L, 61R) extending to an inside of the catalyst case unit (51) in the connecting portion (60), and as viewed in an axial direction of the axis (51a) of the catalyst case unit (51), the inward extending pipe portion (61R) of the upstream side exhaust pipe (50R) having a shorter distance of distances between the axes (50L1, 50R1) of the upstream side exhaust pipes (50L, 50R) and an inner surface (51d) of the catalyst case unit (51) in a direction orthogonal to the axes (50L1, 50R1) of the upstream side exhaust pipes (50L, 50R) may extend deeper into the inside of the catalyst case unit (51) than the upstream side exhaust pipe (50L) having a longer distance.

In addition, in the above-described constitution, the upstream side exhaust pipe (50L, 50R) may extend from an exhaust port (31b, 31c) of the internal combustion engine (11) to the catalyst case unit (51), and the catalyst case unit (51) may be disposed outward in a vehicle width direction with respect to the exhaust port (31b, 31c).

In addition, in the above-described constitution, a reinforcing member (58) reinforcing the upstream side exhaust pipe (50L, 50R) may be provided, the reinforcing member (58) may include an inside reinforcing member (70) located in a position between the plurality of upstream side exhaust pipes (50L, 50R) and connecting the plurality of upstream side exhaust pipes (50L, 50R) to each other and an outside reinforcing member (71) located outward of the inside reinforcing member (70) and disposed on the upstream side exhaust pipe (50R), and a plate thickness (t1) of the outside reinforcing member (71) may be smaller than a plate thickness (t2, t3) of the inside reinforcing member (70).

In addition, in the above-described constitution, the inside reinforcing member (70) may be provided as separate parts on a front surface side and a rear surface side of the upstream side exhaust pipe (50L, 50R) in the saddle riding vehicle.

In addition, in the above-described constitution, the upstream side exhaust pipe (50L, 50R) may include a downward extending portion (55L, 55R) extending downward from the exhaust port (31b, 31c) and a sideward extending portion (56L, 56R) extending outward in the vehicle width direction from a lower end of the downward extending portion (55L, 55R), and the sideward extending portion (56L, 56R) may be connected to the catalyst case unit (51) in the connecting portion (60).

In addition, in the above-described constitution, the catalyst case unit (51) may be disposed rearwardly downward as viewed from a side of the vehicle, and the connecting portion (60) may be provided to a front end portion (51b) of the catalyst case unit (51).

Further, in the above-described constitution, a vehicle body frame (10) of the saddle riding vehicle may include a head pipe (16) supporting a steering system (12), a down frame (19) extending downward from the head pipe (16), and a lower frame (20) extending rearward below the internal combustion engine (11) from the down frame (19), the upstream side exhaust pipe (50L, 50R) may extend downward from the exhaust port (31b, 31c) in a front surface of the internal combustion engine (11) while passing a side of the down frame (19), and at least a part of the connecting portion (60) may be disposed in front of the down frame (19) and the lower frame (20) as viewed from a side of the vehicle.

In addition, in the above-described constitution, the axis (51a) of the catalyst case unit (51) may extend in a forward-rearward direction of the vehicle, and in a case where the axis (51a) of the catalyst case unit (51) and the axis (50L1, 50R1) of the upstream side exhaust pipe (50L, 50R) are viewed in a direction orthogonal to the axis (51a) from above the catalyst case unit (51), the axis (50L1, 50R1) of the upstream side exhaust pipe (50L, 50R) and the axis (51a) of the catalyst case unit (51) may be in substantially right-angled positional relation to each other.

In addition, in the above-described constitution, a plurality of the upstream side exhaust pipes (50L, 50R) may be provided so as to extend from exhaust ports (31b, 31c) of the internal combustion engine (11), a reinforcing member (58) reinforcing the upstream side exhaust pipes (50L, 50R) may be provided, a collecting portion (57) in which the plurality of upstream side exhaust pipes (50L, 50R) collect together may be disposed outward in a vehicle width direction with respect to the exhaust ports (31b, 31c), the reinforcing member (58) may be provided to the collecting portion (57), the reinforcing member (58) may include an inside reinforcing member (70) located in a position between the plurality of upstream side exhaust pipes (50L, 50R) and connecting the plurality of upstream side exhaust pipes (50L, 50R) to each other and an outside reinforcing member (71) located in a position outward of the inside reinforcing member (70) and disposed on the upstream side exhaust pipe (50R), and a plate thickness (t1) of the outside reinforcing member (71) may be smaller than a plate thickness (t2, t3) of the inside reinforcing member (70).

In addition, in the above-described constitution, the inside reinforcing member (70) may be provided as separate parts on a front surface side and a rear surface side of the upstream side exhaust pipes (50L, 50R) in the saddle riding vehicle.

Further, in the above-described constitution, the collecting portion (57) may be connected to the upstream side of the catalyst (52) in the catalyst case unit (51), and the plurality of upstream side exhaust pipes (50L, 50R) may be arranged alongside each other in the collecting portion (57).

In addition, in the above-described constitution, axes (50L1, 50R1) of the upstream side exhaust pipes (50L, 50R) in the collecting portion (57) may be in substantially right-angled positional relation to the axis (51a) of the catalyst case unit (51).

In addition, in the above-described constitution, the plurality of upstream side exhaust pipes (50L, 50R) may include inward extending pipe portions (61L, 61R) extending to an inside of the catalyst case unit (51) in the collecting portion (57), and as viewed in an axial direction of the axis (51a) of the catalyst case unit (51), the inward extending pipe portion (61R) of the upstream side exhaust pipe (50R) having a shorter distance of distances between the axes (50L1, 50R1) of the upstream side exhaust pipes (50L, 50R) and an inner surface (51d) of the catalyst case unit (51) in a direction orthogonal to the axes (50L1, 50R1) of the upstream side exhaust pipes (50L, 50R) may extend deeper into the inside of the catalyst case unit (51) than the upstream side exhaust pipe (50L) having a longer distance.

In addition, in the above-described constitution, a muffler (34) may be provided on a downstream side of the upstream side exhaust pipes (50L, 50R), and the muffler (34) may include a muffler exhaust port (84c, 86a) discharging exhaust to an outside, and an exhaust port cover (88, 188) covering the muffler exhaust port (84c, 86a) may be provided, and the exhaust port cover (88, 188) may include a linear portion (88a, 188c) covering a part of the muffler exhaust port (84c, 86a).

In addition, in the above-described constitution, the plurality of upstream side exhaust pipes (50L, 50R) may include downward extending portions (55L, 55R) extending downward from the exhaust ports (31b, 31c) and sideward extending portions (56L, 56R) extending outward in the vehicle width direction from lower ends of the downward extending portions (55L, 55R) and connected to the catalyst case unit (51), and the collecting portion (57) may be a part in which the plurality of sideward extending portions (56L, 56R) collect together.

In addition, in the above-described constitution, the catalyst case unit (51) may be disposed rearwardly downward as viewed from a side of the vehicle, and the collecting portion (57) may be connected to a front end portion (51b) of the catalyst case unit (51).

Further, in the above-described constitution, a vehicle body frame (10) of the saddle riding vehicle may include a head pipe (16) supporting a steering system (12), a down frame (19) extending downward from the head pipe (16), and a lower frame (20) extending rearward below the internal combustion engine (11) from the down frame (19), and the reinforcing member (58) may be provided to the upstream side exhaust pipes (50L, 50R) and provided in a position in front of the down frame (19) and the lower frame (20) as viewed from a side of the vehicle.

Effects of the Invention

An exhaust structure for a saddle riding vehicle includes: an exhaust pipe connected to an internal combustion engine; and a catalyst disposed in the exhaust pipe; the exhaust pipe including a catalyst case unit housing the catalyst and an upstream side exhaust pipe disposed on an upstream side of the catalyst case unit; the catalyst case unit having a larger diameter than the upstream side exhaust pipe; the upstream side exhaust pipe being connected to the catalyst case unit in a connecting portion located on an upstream side of the catalyst in a flow of exhaust; in the connecting portion, an axis of the upstream side exhaust pipe and an axis of the catalyst case unit being in substantially right-angled positional relation to each other.

According to this constitution, in the connecting portion in which the upstream side exhaust pipe is connected to the catalyst case unit, the exhaust in the upstream side exhaust pipe flows into the catalyst case unit in a direction at substantially a right angle to the axis of the catalyst case unit. Thus, a disturbance occurs in the flow of the exhaust and the exhaust is distributed on the upstream side of the catalyst in the catalyst case unit, so that the exhaust can be fed to the catalyst uniformly.

In addition, in the above-described constitution, a plurality of the upstream side exhaust pipes may be connected to the catalyst case unit in the connecting portion.

According to this constitution, the exhaust flows into the catalyst case unit in a direction at substantially a right angle to the axis of the catalyst case unit from the plurality of upstream side exhaust pipes. Thus, a disturbance occurs in the flow of the exhaust on the upstream side of the catalyst, so that the exhaust can be fed to the catalyst uniformly.

In addition, in the above-described constitution, the plurality of upstream side exhaust pipes may be arranged alongside and substantially in parallel with each other in the connecting portion.

According to this constitution, exhausts flow from the plurality of upstream side exhaust pipes at substantially a right angle to the axis of the catalyst case unit and substantially in parallel with each other, and flow into the catalyst case unit. Thus, a disturbance occurs in the flow of the exhausts on the upstream side of the catalyst, so that the exhausts can be fed to the catalyst uniformly. In addition, the plurality of upstream side exhaust pipes can be arranged compactly.

Further, in the above-described constitution, the plurality of upstream side exhaust pipes may include inward extending pipe portions extending to an inside of the catalyst case unit in the connecting portion, and as viewed in an axial direction of the axis of the catalyst case unit, the inward extending pipe portion of the upstream side exhaust pipe having a shorter distance of distances between the axes of the upstream side exhaust pipes and an inner surface of the catalyst case unit in a direction orthogonal to the axes of the upstream side exhaust pipes may extend deeper into the inside of the catalyst case unit than the upstream side exhaust pipe having a longer distance.

According to this constitution, an exhaust G1 that enters the inside of the catalyst case unit from the upstream side exhaust pipe having the shorter distance causes a flow rotating along the inner circumferential surface of the catalyst case unit, and an exhaust G2 that enters the inside of the catalyst case unit from the upstream side exhaust pipe having the longer distance merges with the rotating flow. Thus, a disturbance in the flow of the exhausts can be generated efficiently on the upstream side of the catalyst, so that the exhausts can be fed to the catalyst uniformly.

In addition, in the above-described constitution, the upstream side exhaust pipe may extend from an exhaust port of the internal combustion engine to the catalyst case unit, and the catalyst case unit may be disposed outward in a vehicle width direction with respect to the exhaust port.

According to this constitution, the catalyst case unit is disposed outward in the vehicle width direction with respect to the exhaust port. Spaces are therefore secured easily in parts located above and below the exhaust port.

In addition, in the above-described constitution, a reinforcing member reinforcing the upstream side exhaust pipe may be provided, the reinforcing member may include an inside reinforcing member located in a position between the plurality of upstream side exhaust pipes and connecting the plurality of upstream side exhaust pipes to each other and an outside reinforcing member located outward of the inside reinforcing member and disposed on the upstream side exhaust pipe, and a plate thickness of the outside reinforcing member may be smaller than a plate thickness of the inside reinforcing member.

According to this constitution, the strength of the upstream side exhaust pipes can be increased effectively by the inside reinforcing member located in a position between the plurality of upstream side exhaust pipes and connecting the plurality of upstream side exhaust pipes to each other. In addition, because the plate thickness of the outside reinforcing member disposed outward of the inside reinforcing member is smaller than the plate thickness of the inside reinforcing member, a weight reduction can be achieved while the strength of the upstream side exhaust pipes is increased. Further, because the inside reinforcing member is provided, foreign matter such as grass or the like can be prevented from getting caught between the plurality of upstream side exhaust pipes, and the exhaust structure is cleaned easily.

In addition, in the above-described constitution, the inside reinforcing member may be provided as separate parts on a front surface side and a rear surface side of the upstream side exhaust pipe in the saddle riding vehicle.

According to this constitution, the inside reinforcing member is easily provided to the upstream side exhaust pipes at a time of manufacturing.

In addition, in the above-described constitution, the upstream side exhaust pipe may include a downward extending portion extending downward from the exhaust port and a sideward extending portion extending outward in the vehicle width direction from a lower end of the downward extending portion, and the sideward extending portion may be connected to the catalyst case unit in the connecting portion.

According to this constitution, because the sideward extending portion extending outward in the vehicle width direction from the lower end of the downward extending portion is connected to the catalyst case unit in the connecting portion, the exhaust structure can be made compact in a vertical direction in the vicinity of the catalyst case unit.

In addition, in the above-described constitution, the catalyst case unit may be disposed rearwardly downward as viewed from a side of the vehicle, and the connecting portion may be provided to a front end portion of the catalyst case unit.

According to this constitution, because the catalyst case unit is disposed rearwardly downward as viewed from the side of the vehicle, a front portion of the catalyst case unit can be disposed at a high position, and the front portion of the catalyst case unit can be disposed at a position distant from a road surface. In addition, the lengths of the upstream side exhaust pipes can be shortened.

Further, in the above-described constitution, a vehicle body frame of the saddle riding vehicle may include a head pipe supporting a steering system, a down frame extending downward from the head pipe, and a lower frame extending rearward below the internal combustion engine from the down frame, the upstream side exhaust pipe may extend downward from the exhaust port in a front surface of the internal combustion engine while passing a side of the down frame, and at least a part of the connecting portion may be disposed in front of the down frame and the lower frame as viewed from a side of the vehicle.

According to this constitution, because the connecting portion is disposed in front of the down frame and the lower frame as viewed from the side of the vehicle, the upstream side exhaust pipe is easily extended outward in the vehicle width direction, and the axis of the upstream side exhaust pipe and the axis of the catalyst case unit are easily arranged at substantially a right angle to each other. In addition, the upstream side exhaust pipe can be shortened.

In addition, in the above-described constitution, the axis of the catalyst case unit may extend in a forward-rearward direction of the vehicle, and in a case where the axis of the catalyst case unit and the axis of the upstream side exhaust pipe are viewed in a direction orthogonal to the axis of the catalyst case unit from above the catalyst case unit, the axis of the upstream side exhaust pipe and the axis of the catalyst case unit may be in substantially right-angled positional relation to each other.

According to this constitution, the connecting portion and the catalyst case unit can be arranged compactly.

In addition, in the above-described constitution, a plurality of the upstream side exhaust pipes may be provided so as to extend from exhaust ports of the internal combustion engine, a reinforcing member reinforcing the upstream side exhaust pipes may be provided, a collecting portion in which the plurality of upstream side exhaust pipes collect together may be disposed outward in a vehicle width direction with respect to the exhaust ports, the reinforcing member may be provided to the collecting portion, the reinforcing member may include an inside reinforcing member located in a position between the plurality of upstream side exhaust pipes and connecting the plurality of upstream side exhaust pipes to each other and an outside reinforcing member located in a position outward of the inside reinforcing member and disposed on the upstream side exhaust pipe, and a plate thickness of the outside reinforcing member may be smaller than a plate thickness of the inside reinforcing member.

According to this constitution, the collecting portion in which the plurality of upstream side exhaust pipes collect together and the reinforcing member are arranged outward in the vehicle width direction with respect to the exhaust ports, and therefore a ground clearance is easily secured. In addition, the strength of the upstream side exhaust pipes can be increased by the simple structure of the inside reinforcing member located in a position between the plurality of upstream side exhaust pipes and connecting the plurality of exhaust pipes to each other. In addition, because the plate thickness of the outside reinforcing member disposed outward of the inside reinforcing member is smaller than the plate thickness of the inside reinforcing member, a weight reduction can be achieved while the strength of the upstream side exhaust pipes is increased.

In addition, in the above-described constitution, the inside reinforcing member may be provided as separate parts on a front surface side and a rear surface side of the upstream side exhaust pipes in the saddle riding vehicle.

According to this constitution, the inside reinforcing member is easily provided to the upstream side exhaust pipes at a time of manufacturing.

In addition, in the above-described constitution, the collecting portion may be connected to the upstream side of the catalyst in the catalyst case unit, and the plurality of upstream side exhaust pipes may be arranged alongside each other in the collecting portion.

According to this constitution, exhaust flows from the plurality of upstream side exhaust pipes to the catalyst case unit. Thus, the flow of the exhaust can be disturbed in the catalyst case unit, and the exhaust can be distributed, so that the exhaust can be fed to the catalyst uniformly. In addition, because the upstream side exhaust pipes are arranged alongside each other in the collecting portion, the upstream side exhaust pipes can be arranged compactly.

Further, in the above-described constitution, the axes of the upstream side exhaust pipes in the collecting portion may be in substantially right-angled positional relation to the axis of the catalyst case unit.

According to this constitution, in the collecting portion, exhaust in the upstream side exhaust pipes flows into the catalyst case unit in a direction at substantially a right angle to the axis of the catalyst case unit. Thus, a disturbance occurs in the flow of the exhaust and the exhaust is distributed in the catalyst case unit, so that the exhaust can be fed to the catalyst uniformly.

In addition, in the above-described constitution, the plurality of upstream side exhaust pipes may include inward extending pipe portions extending to an inside of the catalyst case unit in the collecting portion, and as viewed in an axial direction of the axis of the catalyst case unit, the inward extending pipe portion of the upstream side exhaust pipe having a shorter distance of distances between the axes of the upstream side exhaust pipes and an inner surface of the catalyst case unit in a direction orthogonal to the axes of the upstream side exhaust pipes may extend deeper into the inside of the catalyst case unit than the upstream side exhaust pipe having a longer distance.

According to this constitution, an exhaust that enters the inside of the catalyst case unit from the upstream side exhaust pipe having the shorter distance causes a flow rotating along the inner surface of the catalyst case unit, and an exhaust that enters the inside of the catalyst case unit from the upstream side exhaust pipe having the longer distance merges with the rotating flow. Thus, a disturbance in the flow of the exhausts can be generated efficiently on the upstream side of the catalyst, so that the exhausts can be fed to the catalyst uniformly.

In addition, in the above-described constitution, a muffler may be provided on a downstream side of the upstream side exhaust pipes, and the muffler may include a muffler exhaust port discharging exhaust to an outside, and an exhaust port cover covering the muffler exhaust port may be provided, and the exhaust port cover may include a linear portion covering a part of the muffler exhaust port.

According to this constitution, the exhaust can be diffused by the linear portion of the exhaust port cover, and the flow rate of the exhaust can be adjusted.

Further, in the above-described constitution, the plurality of upstream side exhaust pipes may include downward extending portions extending downward from the exhaust ports and sideward extending portions extending outward in the vehicle width direction from lower ends of the downward extending portions and connected to the catalyst case unit, and the collecting portion may be a part in which the plurality of sideward extending portions collect together.

According to this constitution, because the sideward extending portions extending outward in the vehicle width direction from the lower ends of the downward extending portions are connected to the catalyst case unit in the collecting portion, the exhaust structure can be made compact in a vertical direction in the vicinity of the catalyst case unit.

In addition, in the above-described constitution, the catalyst case unit may be disposed rearwardly downward as viewed from a side of the vehicle, and the collecting portion may be connected to a front end portion of the catalyst case unit.

According to this constitution, because the catalyst case unit is disposed rearwardly downward as viewed from the side of the vehicle, a front portion of the catalyst case unit can be disposed at a high position, and the front portion of the catalyst case unit can be disposed at a position distant from a road surface. In addition, the lengths of the upstream side exhaust pipes can be shortened.

In addition, in the above-described constitution, a vehicle body frame of the saddle riding vehicle may include a head pipe supporting a steering system, a down frame extending downward from the head pipe, and a lower frame extending rearward below the internal combustion engine from the down frame, and the reinforcing member may be provided to the upstream side exhaust pipes and provided in a position in front of the down frame and the lower frame as viewed from a side of the vehicle.

According to this constitution, the upstream side exhaust pipes in a position in front of the down frame and the lower frame can be protected effectively by the reinforcing member.

MODE FOR CARRYING OUT THE INVENTION

Embodiments of the present invention will hereinafter be described with reference to the drawings. It is to be noted that in the description, directions such as front and rear, left and right, and up and down are the same as directions with respect to a vehicle body unless otherwise specified. In addition, symbol FR illustrated in figures indicates a forward direction of the vehicle body, symbol UP indicates an upward direction of the vehicle body, and symbol LH indicates a leftward direction of the vehicle body.

Figure 1:
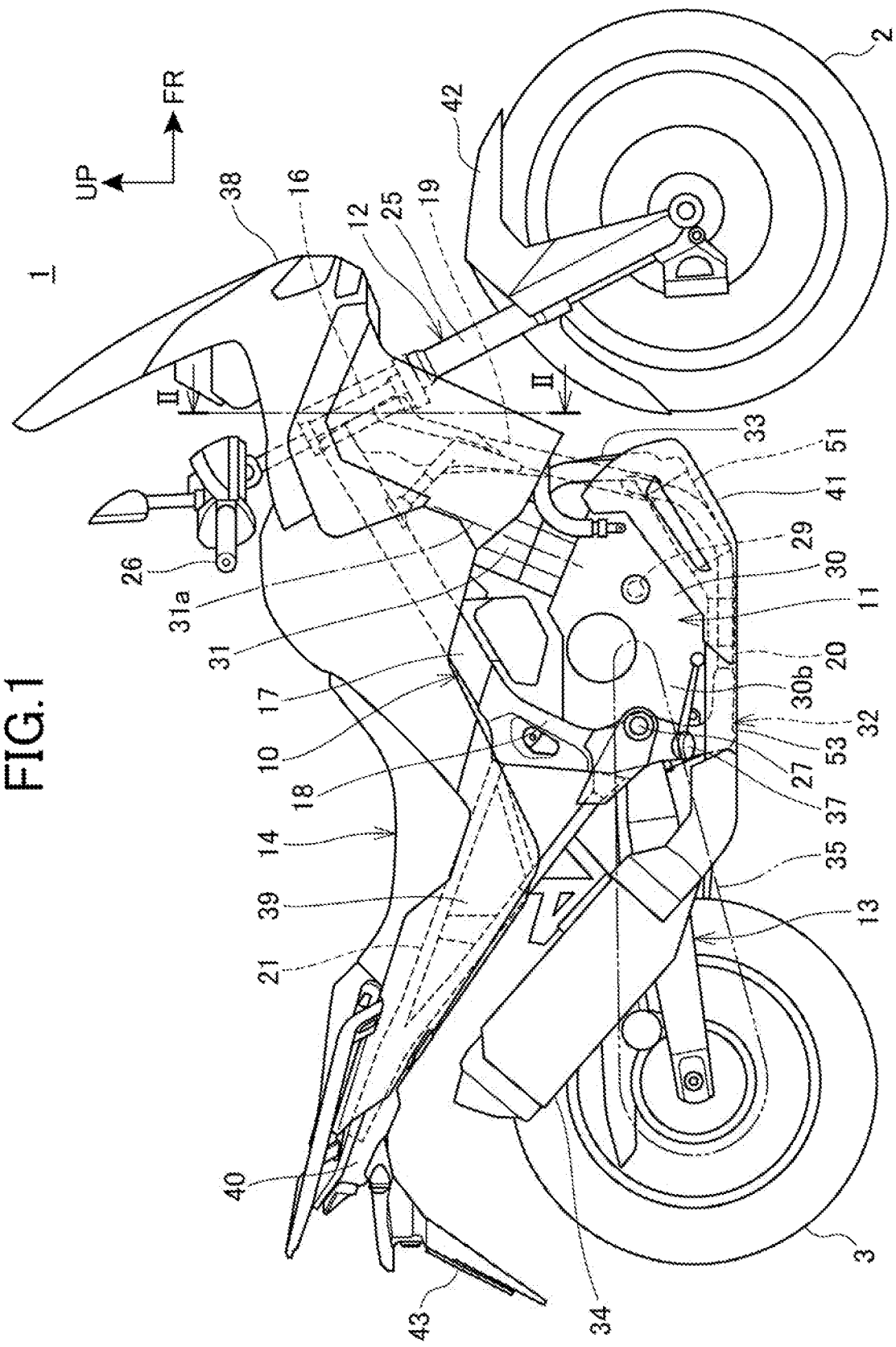
FIG. 1 is a right side view of a motorcycle according to an embodiment of the present invention.

FIG. 1 is a right side view of a motorcycle according to an embodiment of the present invention.

The motorcycle 1 is a vehicle in which an engine 11 (internal combustion engine) as a power unit is supported by a vehicle body frame 10, a steering system 12 steerably supporting a front wheel 2 is steerably supported by a front end of the vehicle body frame 10, and a swing arm 13 supporting a rear wheel 3 is provided to a rear portion of the vehicle body frame 10.

The motorcycle 1 is a saddle riding vehicle on which an occupant is seated so as to straddle a seat 14. The seat 14 is disposed on the rear portion of the vehicle body frame 10.

The vehicle body frame 10 includes a head pipe 16, a pair of left and right main frames 17, a pair of left and right pivot frames 18, a down frame 19, a pair of left and right lower frames 20, and a pair of left and right seat frames 21.

Specifically, the head pipe 16 is disposed at a front end of the vehicle body frame 10, and is located in a vehicle width center.

The left and right main frames 17 extend in a rearwardly downward direction from the head pipe 16 toward the rear.

The left and right pivot frames 18 extend downward from rear ends of the main frames 17.

The down frame 19 extends downward as a single frame from a position in the head pipe 16 which position is below the main frames 17. The down frame 19 is located in the vehicle width center.

The left and right lower frames 20 branch left and right from a lower end portion of the down frame 19, each extend rearward, and are connected to lower end portions of the pivot frames 18.

The left and right seat frames 21 extend rearwardly upward from upper portions of the pivot frames 18.

The steering system 12 includes a pair of left and right front fork members 25 steerably provided via a steering shaft (not illustrated) rotatably supported by the head pipe 16 and handlebars 26 attached to upper end portions of the front fork members 25. The front wheel 2 is rotatably supported by lower end portions of the front fork members 25.

The swing arm 13 has a front end portion rotatably supported by a pivot shaft 27 that couples the left and right pivot frames 18 to each other in a vehicle width direction. The swing arm 13 swings up and down about the pivot shaft 27. The rear wheel 3 is rotatably supported by a rear end portion of the swing arm 13.

The engine 11 is disposed between the main frames 17 and the lower frames 20 and between the down frame 19 and the pivot frames 18 as viewed from the side of the vehicle. The engine 11 is supported by the vehicle body frame 10.

The engine 11 includes a crankcase 30 supporting a crankshaft 29 extending horizontally in the vehicle width direction (left-right direction) and a cylinder portion 31 extending upward from a front portion of the crankcase 30. A cylinder axis 31a of the cylinder portion 31 is forwardly inclined with respect to a vertical.

An intake device (not illustrated) of the engine 11 is connected to an intake port in a rear surface of the cylinder portion 31.

An exhaust device 32 of the engine 11 includes an exhaust pipe 33 connected to a front surface of the cylinder portion 31 and a muffler 34 connected to a downstream end of the exhaust pipe 33.

The exhaust pipe 33 extends downward from the front surface of the cylinder portion 31, passes below the engine 11, and extends rearward. The muffler 34 is disposed outward of the rear wheel 3.

A rear portion of the crankcase 30 is a transmission case portion 30b that houses a transmission. The power of the engine 11 is transmitted to the rear wheel 3 by a driving chain 35 that connects an output shaft of the transmission and the rear wheel 3 to each other.

The seat 14 is supported by the seat frames 21 from below.

A fuel tank 36 is disposed between the head pipe 16 and the seat 14. The fuel tank 36 is supported by the main frames 17 above the engine 11.

Steps 37 on which a driver places feet thereof are provided as a left-right pair to the lower end portions of the pivot frames 18.

The motorcycle 1 has a vehicle body cover that covers the vehicle body of the vehicle body frame 10, the engine 11, and the like. The vehicle body cover includes: a front cover 38 that covers the head pipe 16 and an upper portion of the steering system 12 from the front and sides; a rear side cover 39 that is below the seat 14 and covers the seat frame 21; a tail cover 40 that covers a rear portion of the seat 14 from above; and an under cover 41 that covers a lower portion of the engine 11 from the front.

The motorcycle 1 also includes a front fender 42 covering the front wheel 2 from above and a rear fender 43 covering the rear wheel 3 from above.

Figure 2:
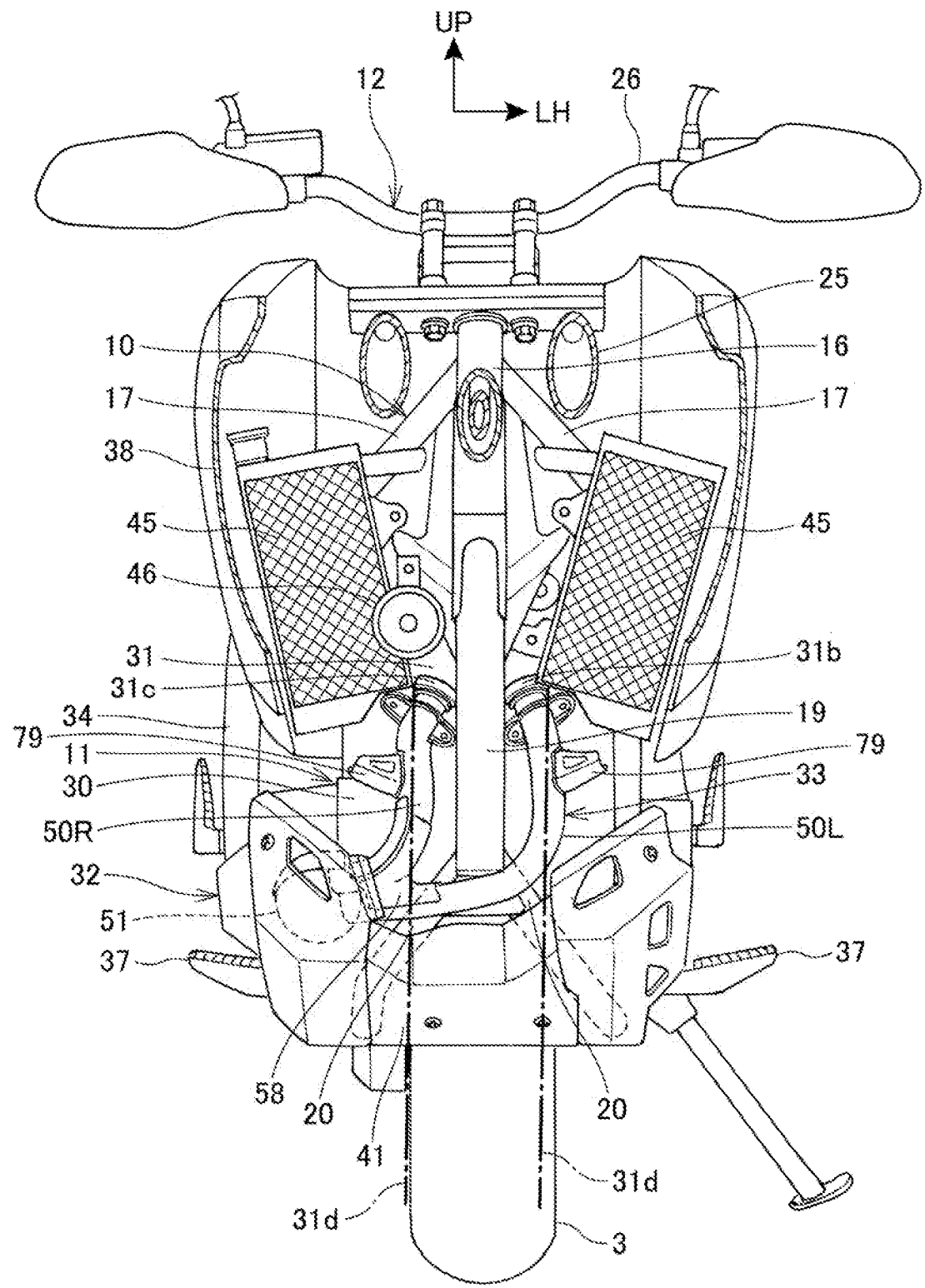
FIG. 2 is a sectional view taken along a line II-II of FIG. 1.

FIG. 2 is a sectional view taken along a line II-II of FIG. 1.

Plate-shaped radiators 45 of the engine 11 are provided as a left-right pair on the left and right sides of the down frame 19. The radiators 45 are covered by a left side portion and a right side portion of the front cover 38 from the sides.

A plurality of exhaust ports 31*b* and 31*c* are arranged side by side in the vehicle width direction in a front surface of a cylinder head of the cylinder portion 31 of the engine 11. The exhaust ports 31*b* and 31*c* are arranged as a left-right pair so as to be parted to the left and right of the down frame 19. The exhaust ports 31*b* and 31*c* are located below the radiators 45.

A horn 46 is disposed between the radiator 45 on the right side and the down frame 19 and above the exhaust port 31*c*.

Figure 3:
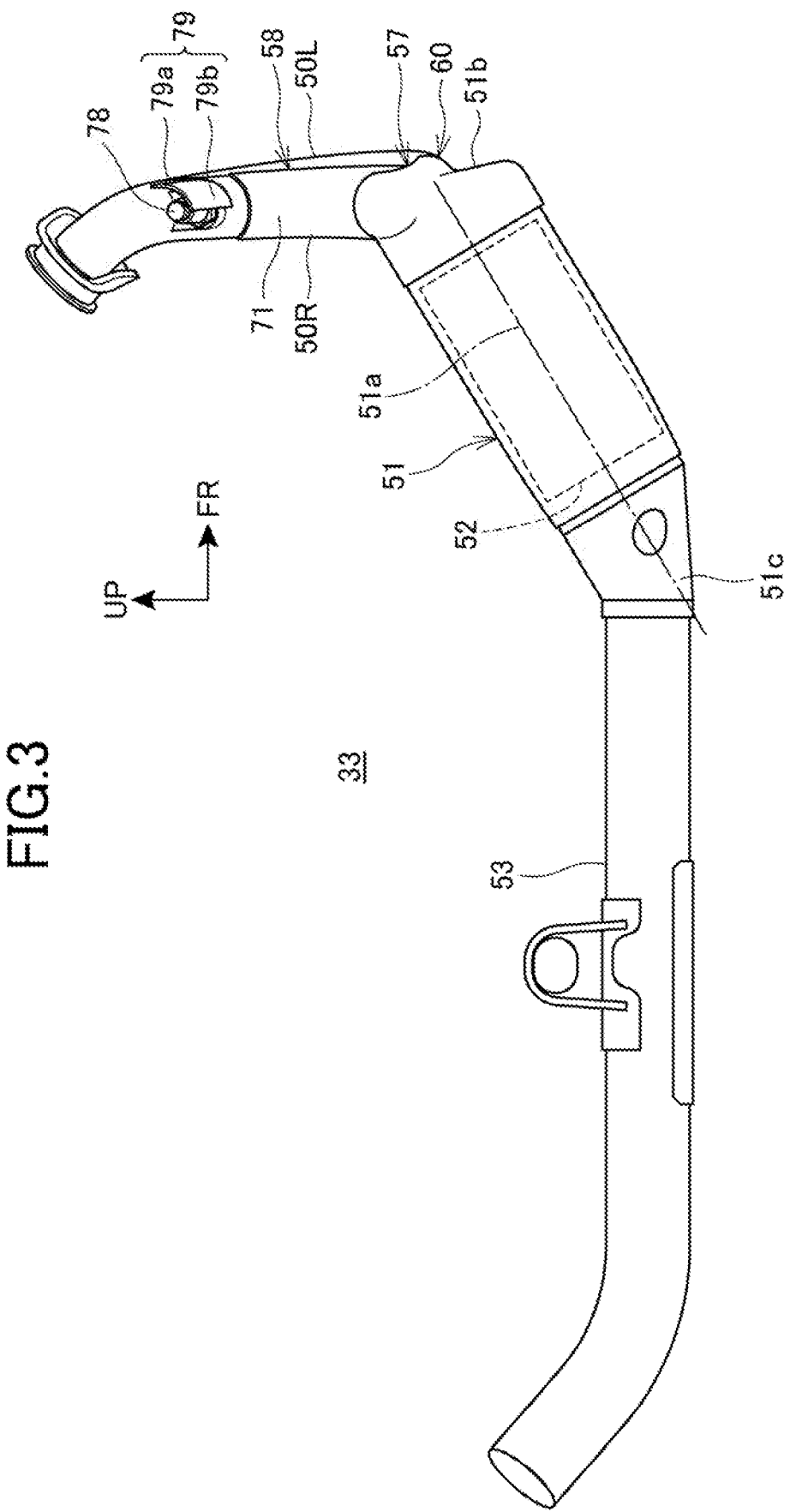
FIG. 3 is a right side view of an exhaust pipe.

FIG. 3 is a right side view of the exhaust pipe 33.

Referring to FIGS. 1 to 3, the exhaust pipe 33 includes: one upstream side exhaust pipe 50L connected to one (left side) exhaust port 31*b* of the left and right exhaust ports; another upstream side exhaust pipe 50R connected to the other (right side) exhaust port 31*c* of the left and right exhaust ports; a catalyst case unit 51 connected to downstream ends of the upstream side exhaust pipes 50L and 50R (plurality of exhaust pipes extending from the exhaust ports of the internal combustion engine); a catalyst 52 housed within the catalyst case unit 51; and a downstream side exhaust pipe 53 that extends from the catalyst case unit 51 to the muffler 34.

Figure 4:
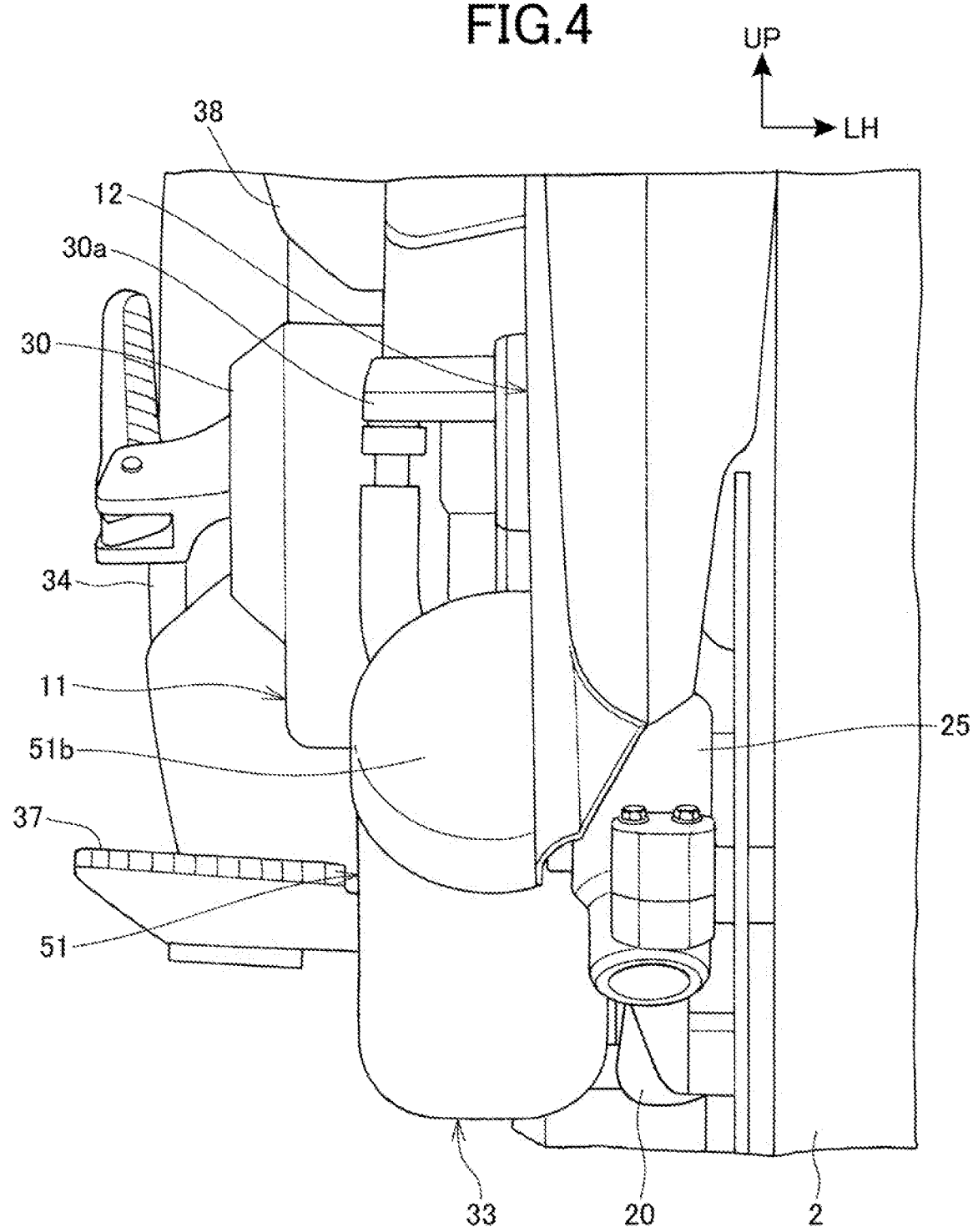
FIG. 4 is a front view of a portion around a catalyst case unit as viewed from a front side.
Figure 5:
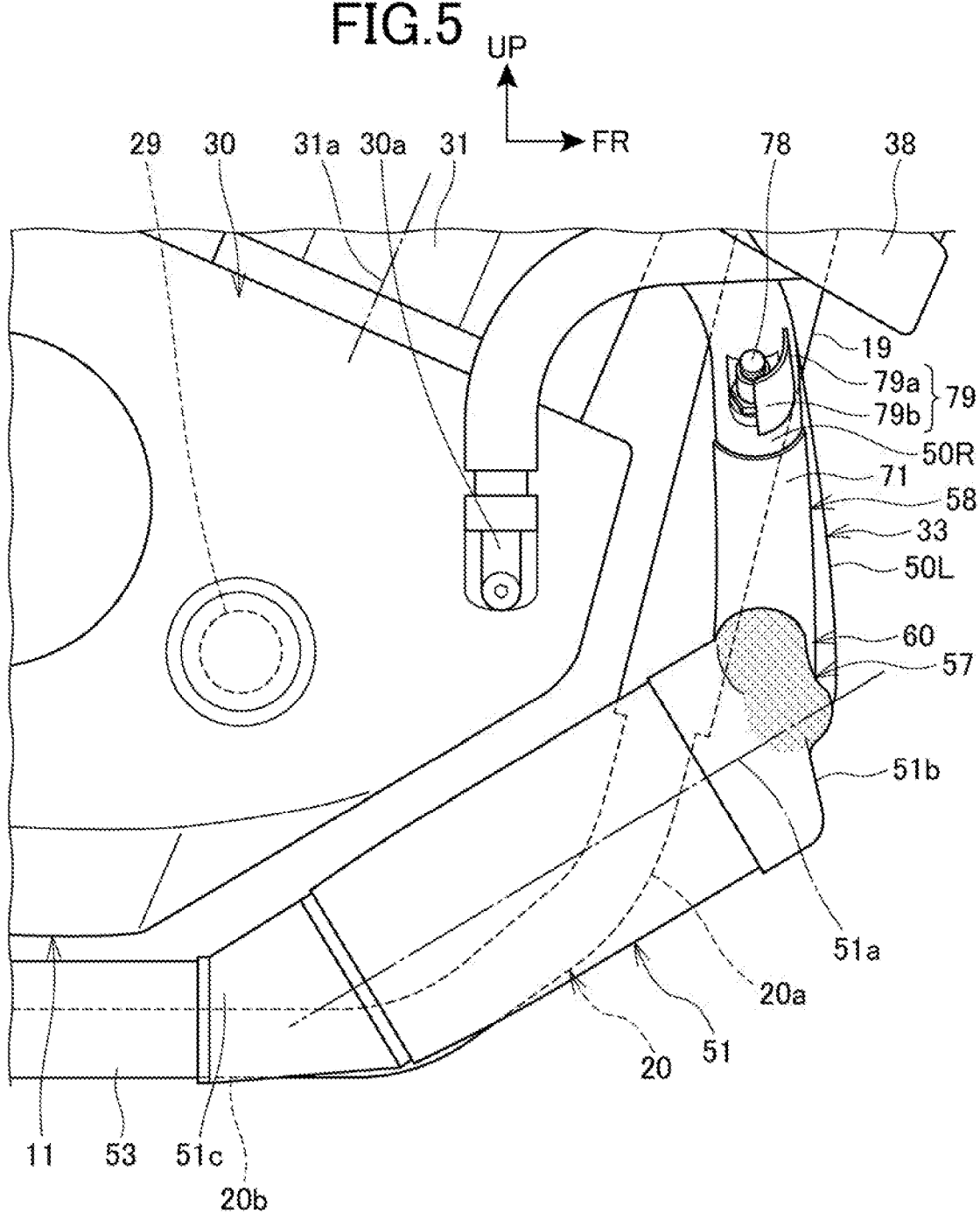
FIG. 5 is a right side view of a portion around an engine and the exhaust pipe.

FIG. 4 is a front view of a portion around the catalyst case unit 51 as viewed from the front side. FIG. 5 is a right side view of a portion around the engine 11 and the exhaust pipe 33. FIG. 4 and FIG. 5 do not illustrate the under cover 41.

Referring to FIGS. 2 to 5, the catalyst case unit 51 is a cylindrical pipe extending long in a forward-rearward direction of the vehicle. The catalyst case unit 51 is a part in which the diameter of a part of the exhaust pipe 33 is made larger than that of the upstream side exhaust pipes 50L and 50R. The outside diameter of the catalyst case unit 51 is larger than the outside diameter of each of the upstream side exhaust pipes 50L and 50R.

The catalyst case unit 51 is disposed so as to be offset to one side (right side) in the vehicle width direction with respect to the vehicle width center. The catalyst case unit 51 is disposed below the exhaust ports 31*b* and 31*c* and on the outside in the vehicle width direction of the exhaust ports 31*b* and 31*c*. The catalyst case unit 51 is located on the outside in the vehicle width direction of virtual straight lines 31*d* extending downward from outer edges in the vehicle width direction of the exhaust ports 31*b* and 31*c*.

The catalyst case unit 51 is disposed below an end portion 30*a* in the vehicle width direction of the crankcase 30 and outward of front portions of the lower frames 20.

Specifically, the left and right lower frames 20 each include: an inclined portion 20*a* inclined so as to be located more outward in the vehicle width direction and more rearward toward the lower side from a lower end of the down frame 19; and a rearward extending portion 20*b* substantially horizontally extending rearward from a lower end of the inclined portion 20*a*.

As viewed from the side of the vehicle, the catalyst case unit 51 overlaps the inclined portions 20*a* as front end portions of the lower frames 20 from the outside in the vehicle width direction. The catalyst case unit 51 is disposed above the rearward extending portions 20*b*.

The catalyst case unit 51 is disposed in a rearwardly descending (forwardly rising) attitude so as to be along the inclined portions 20*a* as viewed from the side of the vehicle. An axis 51*a* of the catalyst case unit 51 is inclined rearwardly downward. In addition, the catalyst case unit 51 is hardly inclined in the left-right direction, and extends straight in the forward-rearward direction of the vehicle. That is, when the catalyst case unit 51 is as viewed from above the vehicle, the axis 51*a* extends straight in the forward-rearward direction of the vehicle.

Because the catalyst case unit 51 rises forwardly upward, a front end portion 51*b* is at a highest position in the catalyst case unit 51. The downstream ends of the upstream side exhaust pipes 50L and 50R are connected to the front end portion 51*b*.

An upstream end of the downstream side exhaust pipe 53 is connected to a rear end portion 51*c* of the catalyst case unit 51. The downstream side exhaust pipe 53 extends rearward from the rear end portion 51*c*. The rear end portion 51*c* of the catalyst case unit 51 is a lower end portion of the catalyst case unit 51, and is located in front of and below the crankshaft 29.

As with the catalyst case unit 51, the muffler 34 is offset to one side (right side) in the vehicle width direction with respect to the vehicle width center. The downstream side exhaust pipe 53 rearwardly extends substantially straight from the rear end portion 51*c* of the catalyst case unit 51, and is connected to the muffler 34. The downstream side exhaust pipe 53 can therefore be shortened.

The catalyst 52 is a porous structure in a honeycomb shape which porous structure has a large number of pores extending along an axial direction within a cylindrical contour. A catalyst substance (platinum, rhodium, and palladium, for example) that decomposes an exhaust gas component is supported on a wall of each of the above-described pores.

The catalyst 52 is fixed to the catalyst case unit 51 by fitting an outer peripheral portion of the catalyst 52 to an inner peripheral portion of the catalyst case unit 51. The catalyst 52 is fitted to the inner peripheral portion of the catalyst case unit 51 via a retaining pipe (not illustrated) enclosing the periphery of the catalyst 52.

As illustrated in FIG. 1 and FIG. 2, the catalyst 52 is covered by a side portion of the under cover 41 from the front, from below, and from the outside.

Figure 6:
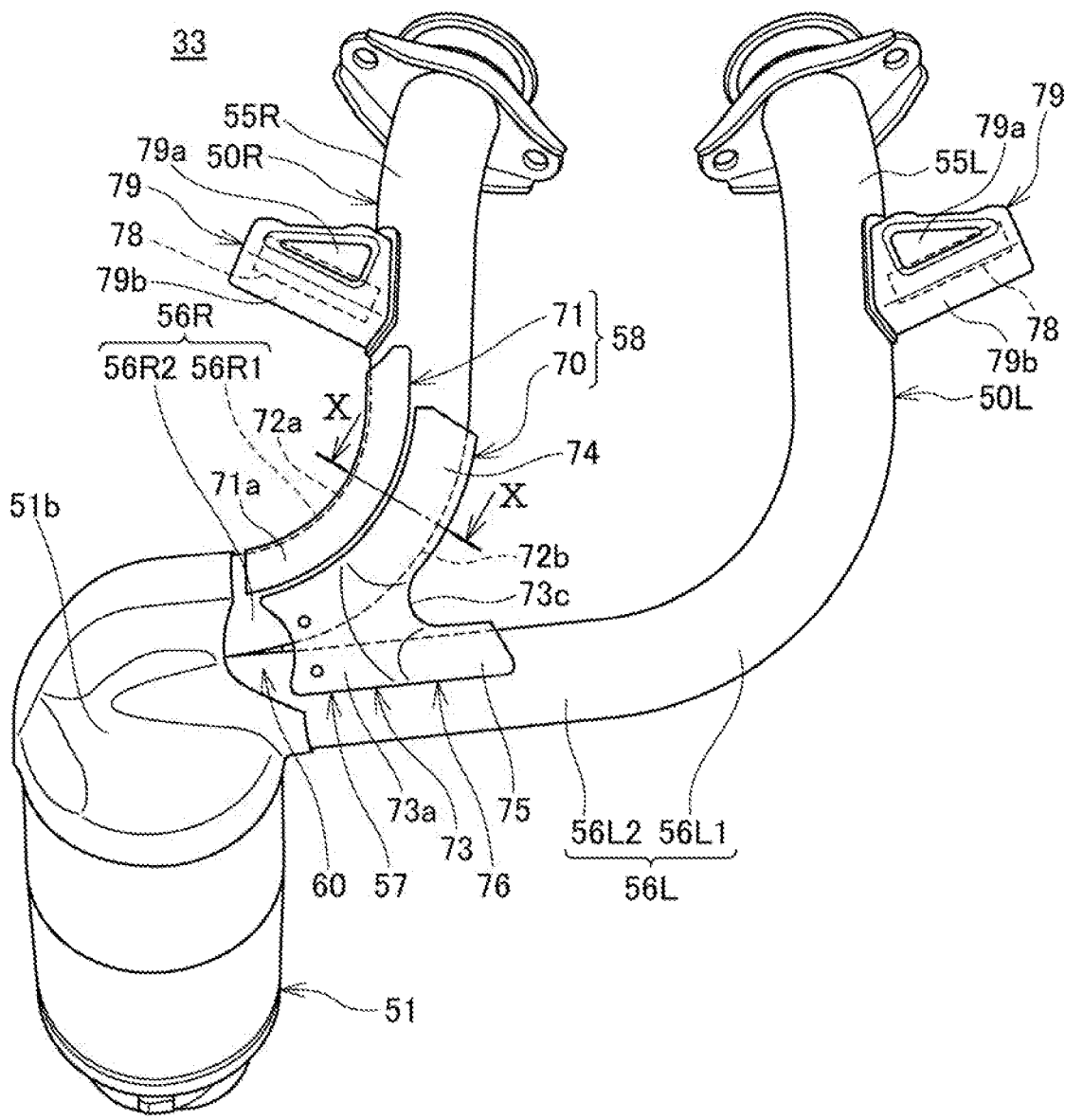
FIG. 6 is a front view of the exhaust pipe as viewed from the front side.
Figure 7:
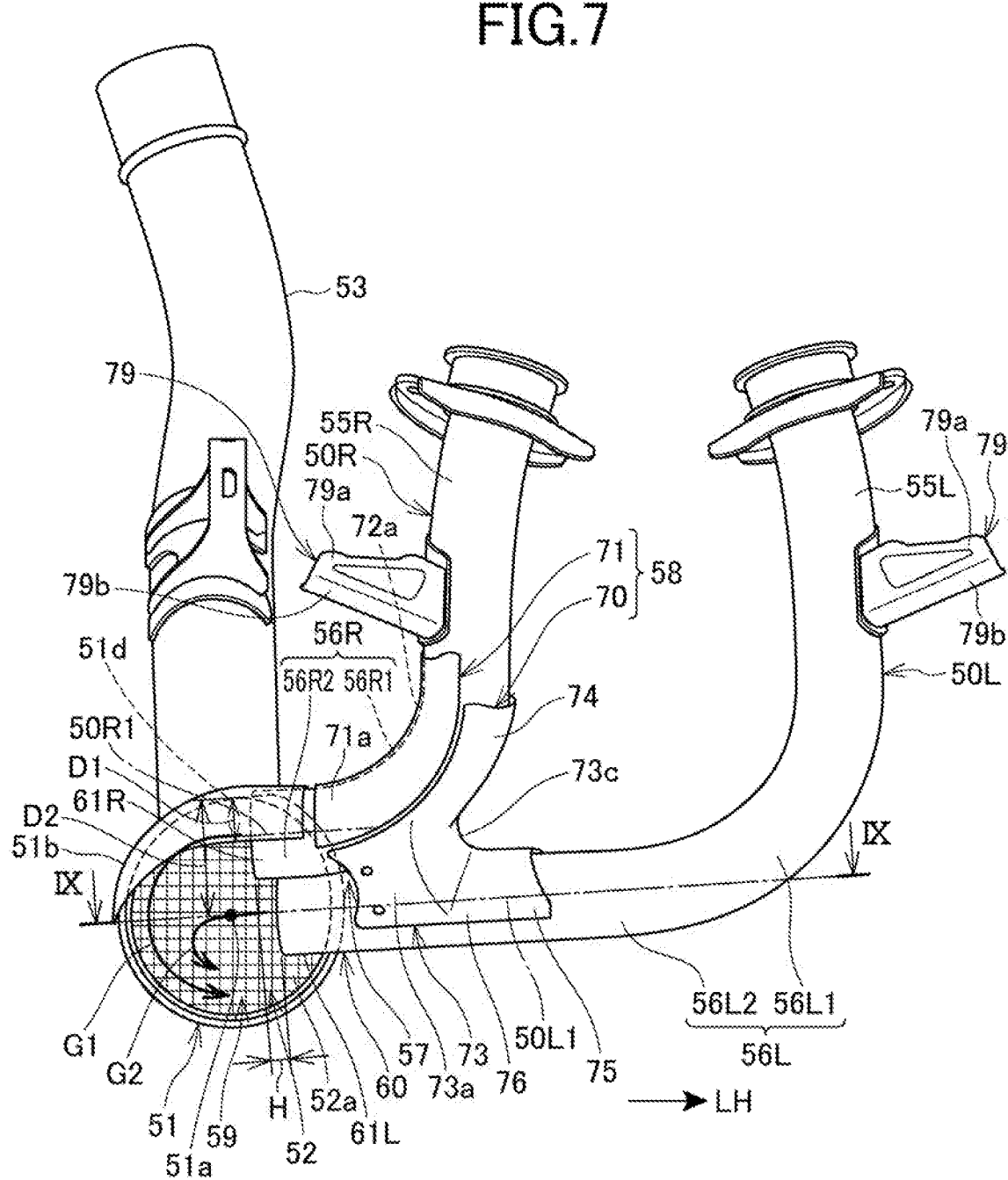
FIG. 7 is a view of the exhaust pipe as viewed from the front side in the axial direction of an axis.
Figure 8:
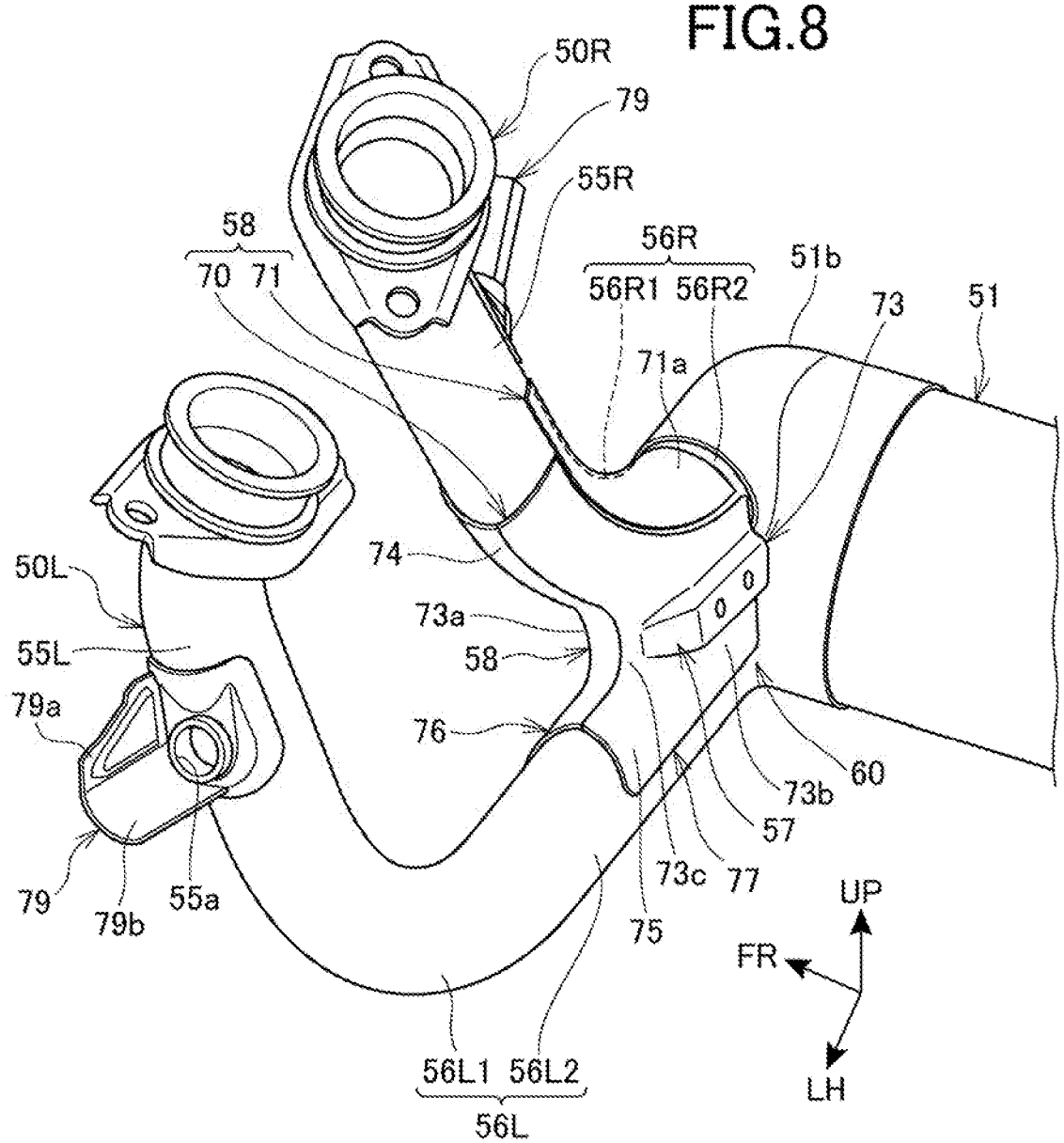
FIG. 8 is a perspective view of the exhaust pipe as viewed from a left rear side.

FIG. 6 is a front view of the exhaust pipe 33 as viewed from the front side. FIG. 7 is a view of the exhaust pipe 33 as viewed from the front side in the axial direction of the axis 51*a*. FIG. 8 is a perspective view of the exhaust pipe 33 as viewed from a left rear side. In FIG. 7, a front surface portion of the catalyst case unit 51 is cut away such that the inside of the catalyst case unit 51 can be seen.

Referring to FIG. 2 and FIGS. 6 to 8, the upstream side exhaust pipe 50L on the left side includes: a downward extending portion 55L that extends downward from the exhaust port 31*b* (FIG. 2) on the left side of the cylinder portion 31; and a sideward extending portion 56L that extends in the vehicle width direction from a lower end of the downward extending portion 55L and is connected to the catalyst case unit 51.

In addition, the upstream side exhaust pipe 50R on the right side includes: a downward extending portion 55R that extends downward from the exhaust port 31*c* (FIG. 2) on the right side of the cylinder portion 31; and a sideward extending portion 56R that extends outward in the vehicle width direction from a lower end of the downward extending portion 55R and is connected to the catalyst case unit 51.

The downward extending portions 55L and 55R are arranged so as to be separated from each other on the left and right of the down frame 19, and extend downward so as to be along the down frame 19.

The downward extending portion 55R on the right side is located on the same side as the catalyst case unit 51 when the left and the right are divided from each other with respect to the down frame 19. The downward extending portion 55L on the left side is located on an opposite side from the catalyst case unit 51 when the left and the right are divided from each other with respect to the down frame 19. The downward extending portion 55L is present at a position more distant from the catalyst case unit 51 than the downward extending portion 55R on the right side.

The sideward extending portion 56L includes: a curved portion 56L1 that bends in the shape of an arc from the lower end of the downward extending portion 55L toward the catalyst case unit 51; and a linear portion 56L2 that linearly extends in the vehicle width direction from the curved portion 56L1 and is connected to the catalyst case unit 51. The linear portion 56L2 straddles the down frame 19 in the vehicle width direction in front of the down frame 19, and extends to the catalyst case unit 51.

The sideward extending portion 56R includes: a curved portion 56R1 that bends in the shape of an arc from the lower end of the downward extending portion 55R toward the catalyst case unit 51; and a linear portion 56R2 that linearly extends in the vehicle width direction from the curved portion 56R1 and is connected to the catalyst case unit 51.

The exhaust pipe 33 includes a collecting portion 57 in which the left and right upstream side exhaust pipes 50L and 50R collect together.

The collecting portion 57 is a part where the left and right sideward extending portions 56L and 56R collect together so as to come into proximity to each other.

Specifically, in the collecting portion 57, the curved portion 56R1 and the linear portion 56R2 of the sideward extending portion 56R come into proximity to the linear portion 56L2 of the sideward extending portion 56L. Incidentally, the sideward extending portion 56R and the sideward extending portion 56L may abut against each other.

The linear portion 56L2 is disposed alongside and below the linear portion 56R2, and extends outward in the vehicle width direction substantially in parallel with the linear portion 56R2.

The exhaust pipe 33 includes a reinforcing member 58 that connects the upstream side exhaust pipe 50L and the upstream side exhaust pipe 50R to each other and reinforces the upstream side exhaust pipe 50L and the upstream side exhaust pipe 50R. The reinforcing member 58 is provided to the collecting portion 57.

The exhaust pipe 33 has sensors 78 for the respective upstream side exhaust pipes 50L and 50R, the sensors 78 detecting oxygen concentrations of exhaust in the upstream side exhaust pipes 50L and 50R.

The sensors 78 are in a rod shape, and are inserted from the sides into sensor supporting holes 55a (FIG. 8) in outer surfaces in the vehicle width direction of the downward extending portions 55L and 55R such that detecting units at ends of the sensors 78 are exposed within the downward extending portions 55L and 55R. As viewed in the front view of FIG. 6, the sensors 78 obliquely extend outward in the vehicle width direction and upward from the downward extending portions 55L and 55R.

In addition, the exhaust pipe 33 has sensor guards 79 covering the sensors 78 on the respective upstream side exhaust pipes 50L and 50R.

The sensor guards 79 obliquely extend outward in the vehicle width direction and upward from the outer surfaces of the downward extending portions 55L and 55R so as to be along the sensors 78.

The sensor guards 79 are a plate member that integrally includes a front surface portion 79a covering the sensor 78 from the front and a lower surface portion 79b covering the sensor 78 from below. Base end portions of the sensor guards 79 are welded to the downward extending portions 55L and 55R.

Figure 9:
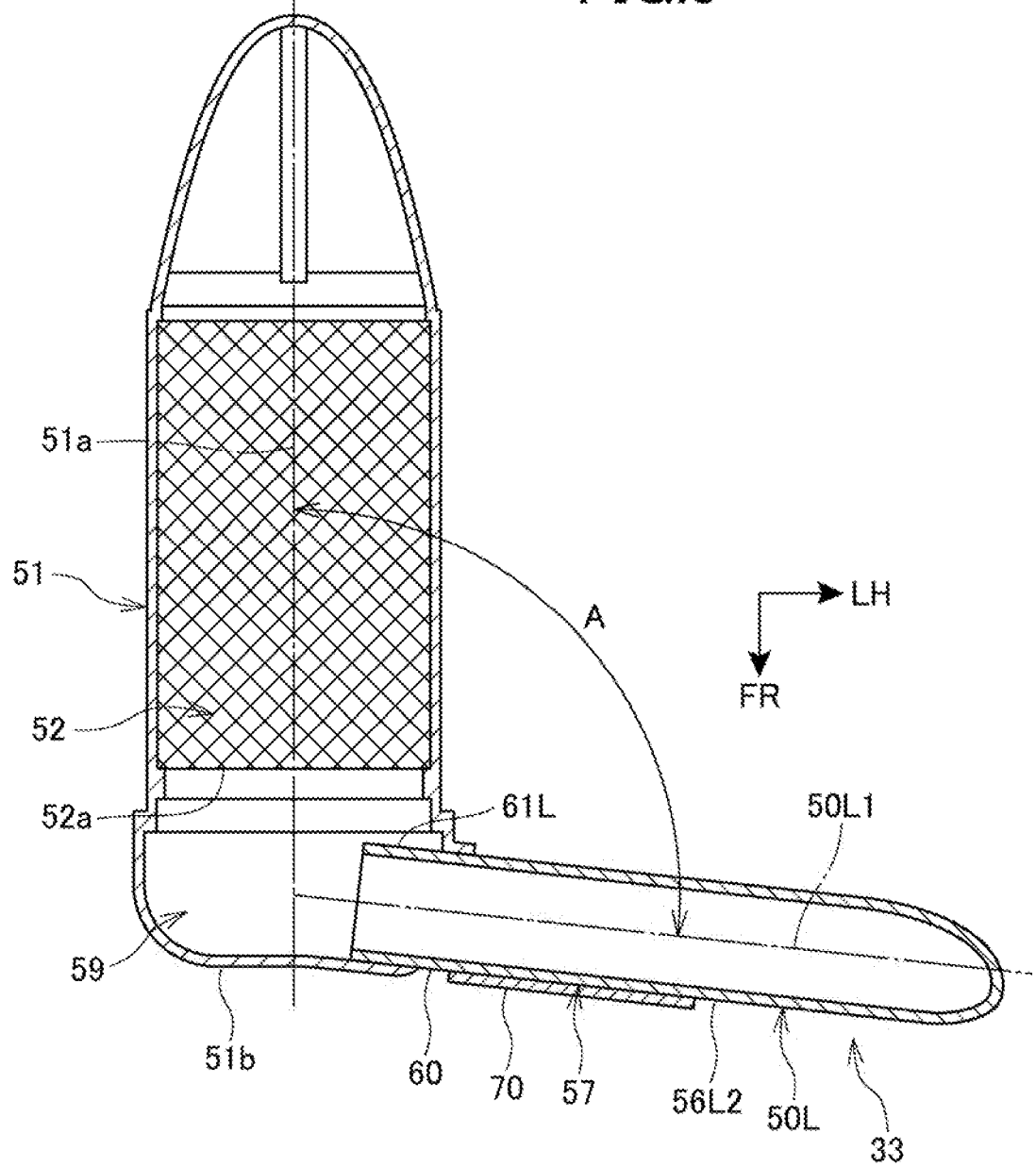
FIG. 9 is a sectional view taken along a line IX-IX of FIG. 7.

FIG. 9 is a sectional view taken along a line IX-IX of FIG. 7.

Referring to FIG. 6, FIG. 7, and FIG. 9, within the catalyst case unit 51, an exhaust inflow space 59 into which exhaust from the upstream side exhaust pipes 50L and 50R flows is disposed between a front surface of the front end portion 51b of the catalyst case unit 51 and a front end surface 52a of the catalyst 52.

The upstream side exhaust pipes 50L and 50R are connected to the catalyst case unit 51 in a connecting portion 60 located on the upstream side of the catalyst 52 in a flow of the exhaust. The connecting portion 60 is an end portion on the outside in the vehicle width direction of the collecting portion 57, and is a part of the collecting portion 57.

The upstream side exhaust pipe 50L includes an inward extending pipe portion 61L at the downstream end of the linear portion 56L2, the inward extending pipe portion 61L extending in the connecting portion 60 to the inside of the catalyst case unit 51.

The upstream side exhaust pipe 50R includes an inward extending pipe portion 61R at the downstream end of the linear portion 56R2, the inward extending pipe portion 61R extending in the connecting portion 60 to the inside of the catalyst case unit 51.

The inward extending pipe portion 61L and the inward extending pipe portion 61R extend in the vehicle width direction substantially in parallel with each other, and communicate with the exhaust inflow space 59.

The inward extending pipe portion 61L and the inward extending pipe portion 61R penetrate a side surface on the inside in the vehicle width direction of the front end portion 51b of the catalyst case unit 51, and enter the inside of the exhaust inflow space 59.

As illustrated in FIG. 9, in the connecting portion 60, an axis 50L1 of the upstream side exhaust pipe 50L which axis 50L1 extends in the vehicle width direction and the axis 51a of the catalyst case unit 51 which axis 51a extends in the forward-rearward direction of the vehicle are substantially in right-angled positional relation to each other. An angle A formed between the axis 50L1 and the axis 51a is substantially 90°.

In the present embodiment, when the axis 51a and the axis 50L1 are viewed in a direction orthogonal to the axis 51a from above the catalyst case unit 51 as in FIG. 9, the angle A formed between the axis 50L1 and the axis 51a is substantially 90°. In the present embodiment, the angle A is 97.1°.

In addition, the axis 50L1 of the upstream side exhaust pipe 50L on the left side and an axis 50R1 (FIG. 7) of the upstream side exhaust pipe 50R on the right side are substantially parallel with each other. Though not illustrated in FIG. 9, the axis 50R1 of the upstream side exhaust pipe 50R and the axis 51a of the catalyst case unit 51 are substantially in right-angled positional relation to each other.

In the present embodiment, when the axis 51*a* and the axis 50R1 are viewed in a direction orthogonal to the axis 51*a* from above the catalyst case unit 51, the angle A formed between the axis 50R1 and the axis 51*a* is substantially 90°.

That is, the upstream side exhaust pipes 50L and 50R are inserted from the vehicle width direction so as to be substantially orthogonal to the tubular catalyst case unit 51 extending in the forward-rearward direction of the vehicle.

Referring to FIG. 7, the inward extending pipe portion 61R is disposed in an upper portion within the exhaust inflow space 59, and opens outward in the vehicle width direction. The inward extending pipe portion 61L is disposed in a vertically intermediate portion within the exhaust inflow space 59, and opens outward in the vehicle width direction below the inward extending pipe portion 61R.

The inward extending pipe portion 61L and the inward extending pipe portion 61R have different lengths within the exhaust inflow space 59.

Specifically, as illustrated in FIG. 7, as viewed in the axial direction of the axis 51*a* of the catalyst case unit 51, a distance D1 between the axis 50R1 and an inner surface 51*d* of the catalyst case unit 51 in a direction orthogonal to the axis 50R1 of the upstream side exhaust pipe 50R is smaller than a distance D2 between the axis 50L1 and the inner surface 51*d* of the catalyst case unit 51 in a direction orthogonal to the axis 50L1 of the upstream side exhaust pipe 50L. Hence, the upstream side exhaust pipe 50R is closer to the inner surface 51*d* than the upstream side exhaust pipe 50L.

The inward extending pipe portion 61R of the upstream side exhaust pipe 50R closer to the inner surface 51*d* than the upstream side exhaust pipe 50L extends deeper into the inside of the catalyst case unit 51 than the inward extending pipe portion 61L.

That is, an end of the inward extending pipe portion 61R protrudes from an end of the inward extending pipe portion 61L by a length H in the axial direction.

In addition, the upstream side exhaust pipe 50R is a pipe shorter than the upstream side exhaust pipe 50L. An exhaust path from the exhaust port 31*c* to the downstream end of the upstream side exhaust pipe 50R is shorter than an exhaust path from the exhaust port 31*b* to the downstream end of the upstream side exhaust pipe 50L.

The upstream side exhaust pipe 50R having the shorter exhaust path described above extends deeper into the inside of the catalyst case unit 51 than the upstream side exhaust pipe 50L having the longer exhaust path described above.

Referring to FIG. 5, the upstream side exhaust pipes 50L and 50R extend downward from the exhaust ports 31*b* and 31*c* while passing through the sides of the down frame 19, and are connected to the front end portion 51*b* of the catalyst case unit 51 via the connecting portion 60.

The front end portion 51*b* of the catalyst case unit 51 is located in front of the down frame 19 and the lower frame 20 as viewed from the side of the vehicle. The connecting portion 60 is disposed in the rear of the front wheel 2 and in front of the down frame 19 and the lower frame 20. Therefore, the connecting portion 60 is easily connected to the catalyst case unit 51 extending in the forward-rearward direction at substantially a right angle from the vehicle width direction, and the upstream side exhaust pipes 50L and 50R can be shortened. In addition, because the upstream side exhaust pipes 50L and 50R are shortened, exhaust at high temperatures flows into the catalyst case unit 51. Thus, the catalyst 52 can be activated quickly, so that the exhaust can be purified efficiently.

Here, in FIG. 5, the part of the connecting portion 60 as viewed from the side of the vehicle is provided with dots for distinction. In the present embodiment, most of the connecting portion 60 is located in front of the down frame 19, and a rear end portion of the connecting portion 60 coincides with the down frame 19 as viewed from the side of the vehicle. It suffices for at least a part of the connecting portion 60 to be located in front of the down frame 19 and the lower frame 20. The whole of the connecting portion 60 may be positioned in front of the down frame 19 and the lower frame 20.

Referring to FIG. 7, the exhaust of the engine 11 passes through each of the upstream side exhaust pipe 50L and the upstream side exhaust pipe 50R, and flows into the exhaust inflow space 59 of the catalyst case unit 51. The exhaust that has flowed into the exhaust inflow space 59 flows rearward through the catalyst 52, flows through the downstream side exhaust pipe 53 into the muffler 34, and is discharged from the muffler 34 to the outside.

Because the upstream side exhaust pipes 50L and 50R are arranged so as to be substantially orthogonal to the catalyst case unit 51, the exhaust in the upstream side exhaust pipes 50L and 50R flows into the exhaust inflow space 59 in a direction at substantially a right angle to the axis 51*a* of the catalyst case unit 51. Thus, a disturbance occurs in the flow of the exhaust and the exhaust is distributed in the exhaust inflow space 59, so that the exhaust can be fed from the exhaust inflow space 59 to the catalyst 52 uniformly.

In addition, because the inward extending pipe portion 61R of the upstream side exhaust pipe 50R, the inward extending pipe portion 61R being disposed in the upper portion of the catalyst case unit 51, is closer to the inner surface 51*d* of the catalyst case unit 51, an exhaust G1 flowing from the upstream side exhaust pipe 50R into the exhaust inflow space 59 rotates along an inner circumferential surface of the catalyst case unit 51. Thus, a disturbance occurs in the flow of the exhaust in the exhaust inflow space 59, so that the exhaust can be fed to the catalyst 52 uniformly.

In addition, an exhaust G2 flowing into the exhaust inflow space 59 from the inward extending pipe portion 61L of the upstream side exhaust pipe 50L, the inward extending pipe portion 61L being disposed in the vertically intermediate portion of the catalyst case unit 51, merges with the exhaust G1 from the central side of the catalyst case unit 51. Thus, a disturbance occurs in the flow of the exhaust in the exhaust inflow space 59, so that the exhaust can be fed to the catalyst 52 uniformly. Here, because the end of the inward extending pipe portion 61R protrudes from the end of the inward extending pipe portion 61L by a length H in the axial direction, the rotating flow of the exhaust G1 can be generated efficiently, and the disturbance of the exhaust can be generated excellently.

Referring to FIGS. 6 to 8, in the collecting portion 57, an interval between the upstream side exhaust pipe 50L and the upstream side exhaust pipe 50R is decreased toward the connecting portion 60 side (downstream side). The reinforcing member 58 connects the upstream side exhaust pipe 50L and the upstream side exhaust pipe 50R to each other in the collecting portion 57.

The reinforcing member 58 includes: an inside reinforcing member 70 that is in a position between the upstream side exhaust pipe 50L and the upstream side exhaust pipe 50R, and connects the upstream side exhaust pipe 50L and the upstream side exhaust pipe 50R to each other; and an outside reinforcing member 71 that is in a position outward of the inside reinforcing member 70, and is provided to the upstream side exhaust pipe 50R.

The reinforcing member 58 is disposed on the upstream side of the connecting portion 60 in the flow of the exhaust.

The outside reinforcing member 71 is a plate coupled so as to be stuck to the surface of the upstream side exhaust pipe 50R. The outside reinforcing member 71 is provided to the curved portion 56R1 of the sideward extending portion 56R of the upstream side exhaust pipe 50R.

The outside reinforcing member 71 is provided to an inner peripheral surface 72a of a bend of the curved portion 56R1. The inner peripheral surface 72a is an outside surface in the vehicle width direction of the curved portion 56R1 as viewed in the front view of FIG. 6.

The outside reinforcing member 71 is a plate bent along the inner peripheral surface 72a. The outside reinforcing member 71 is provided over substantially the entire length of the curved portion 56R1 in the axial direction of the upstream side exhaust pipe 50R. The outside reinforcing member 71 is provided to substantially a half part located on the outside in the vehicle width direction in the circumferential direction of the upstream side exhaust pipe 50R.

The outside reinforcing member 71 extends upward to the vicinity of a lower end portion of the sensor guard 79 on the right side. The sensor guard 79 functions as a member that reinforces the upstream side exhaust pipe 50R together with the outside reinforcing member 71.

The outside reinforcing member 71 is coupled to the curved portion 56R1 by welding, for example.

The inside reinforcing member 70 is a plate coupled so as to be stuck to the surfaces of the upstream side exhaust pipes 50L and 50R. The inside reinforcing member 70 is disposed below the outside reinforcing member 71. The inside reinforcing member 70 is coupled to the upstream side exhaust pipes 50L and 50R by welding, for example.

The inside reinforcing member 70 includes: a coupling portion 73 that vertically couples the sideward extending portions 56L and 56R to each other in the collecting portion 57; a first extending portion 74 that extends from the coupling portion 73 to the upstream side of the upstream side exhaust pipe 50R along the sideward extending portion 56R; and a second extending portion 75 that extends from the coupling portion 73 to the upstream side of the upstream side exhaust pipe 50L along the sideward extending portion 56L.

Specifically, the coupling portion 73 includes: a front side reinforcing portion 73a that vertically couples front surface portions of the sideward extending portions 56L and 56R to each other; a rear side reinforcing portion 73b that vertically couples rear surface portions of the sideward extending portions 56L and 56R to each other; and a forward-rearward coupling portion 73c that couples the front side reinforcing portion 73a and the rear side reinforcing portion 73b to each other in the forward-rearward direction.

The front side reinforcing portion 73a is below an end portion 71a on the downstream side of the outside reinforcing member 71, and couples a lower half portion of a front surface of the curved portion 56R1 and an upper half portion of a front surface of the linear portion 56L2 to each other.

The rear side reinforcing portion 73b is below the end portion 71a on the downstream side of the outside reinforcing member 71, and couples a lower half portion of a rear surface of the curved portion 56R1 and an upper half portion of a rear surface of the linear portion 56L2 to each other.

The forward-rearward coupling portion 73c couples an edge portion on the inside in the vehicle width direction of the front side reinforcing portion 73a and an edge portion on the inside in the vehicle width direction of the rear side reinforcing portion 73b to each other.

The first extending portion 74 extends upward from the forward-rearward coupling portion 73c along the curved portion 56R1. The first extending portion 74 is provided to an outer peripheral surface 72b of the bend of the curved portion 56R1. The outer peripheral surface 72b is an inside surface in the vehicle width direction of the curved portion 56R1 as viewed in the front view of FIG. 6.

The first extending portion 74 is a plate bent along the outer peripheral surface 72b. The first extending portion 74 is provided over substantially the entire length of the curved portion 56R1 in the axial direction of the upstream side exhaust pipe 50R. The first extending portion 74 is provided to substantially a half part located on the inside in the vehicle width direction in the circumferential direction of the upstream side exhaust pipe 50R.

The second extending portion 75 is a plate extending inward in the vehicle width direction from the forward-rearward coupling portion 73c along the linear portion 56L2. The second extending portion 75 is provided to substantially a half part of an upper surface side of the linear portion 56L2 in a circumferential direction of the upstream side exhaust pipe 50L.

Figure 10:
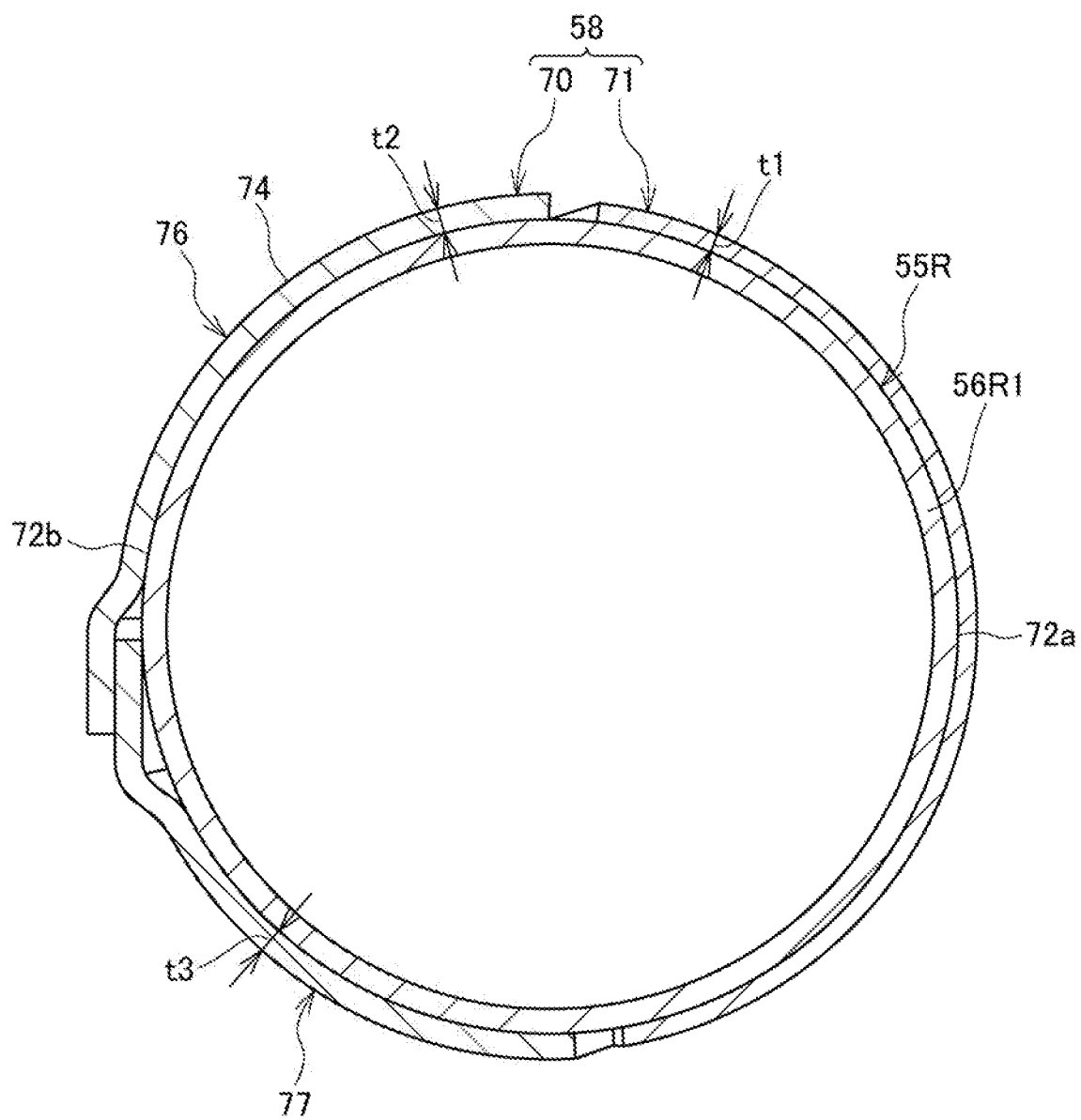
FIG. 10 is a sectional view taken along a line X-X of FIG. 6.

FIG. 10 is a sectional view taken along a line X-X of FIG. 6.

Referring to FIGS. 6 to 8 and FIG. 10, the inside reinforcing member 70 is divided into two front and rear members, which are a front side reinforcing member 76 provided to the front surface sides of the upstream side exhaust pipes 50L and 50R in the motorcycle 1 and a rear side reinforcing member 77 provided to the rear surface sides of the upstream side exhaust pipes 50L and 50R in the motorcycle 1.

The front side reinforcing member 76 constitutes substantially half parts on the front sides of the coupling portion 73, the first extending portion 74, and the second extending portion 75.

The rear side reinforcing member 77 constitutes substantially half parts on the rear sides of the coupling portion 73, the first extending portion 74, and the second extending portion 75.

The inside reinforcing member 70 is thus divided into the front side reinforcing member 76 and the rear side reinforcing member 77 and provided as the separate parts. Thus, the front side reinforcing member 76 and the rear side reinforcing member 77 can be individually assembled to the collecting portion 57, and the inside reinforcing member 70 can be coupled to the upstream side exhaust pipes 50L and 50R easily.

The inside reinforcing member 70 couples the upstream side exhaust pipe 50L and the upstream side exhaust pipe 50R to each other, and can therefore effectively increase the strength and rigidity of the upstream side exhaust pipes 50L and 50R. In addition, the outside reinforcing member 71 is provided to the curved portion 56R1, and can increase the strength and rigidity of the upstream side exhaust pipe 50R.

Here, referring to FIG. 10, a plate thickness t1 of the outside reinforcing member 71 is smaller than a plate thickness t2 of the front side reinforcing member 76 of the inside reinforcing member 70 and a plate thickness t3 of the rear side reinforcing member 77 of the inside reinforcing member 70. In the present embodiment, the front side reinforcing member 76 and the rear side reinforcing member 77 have a same thickness, and thus the plate thickness t2 and the plate thickness t3 are the same.

That is, the plate thicknesses t2 and t3 of the inside reinforcing member 70 coupling the upstream side exhaust pipes 50L and 50R to each other are larger than the plate thickness t1 of the outside reinforcing member 71. Therefore, the inside reinforcing member 70 and the outside reinforcing member 71 can increase the strength and rigidity of the upstream side exhaust pipes 50L and 50R, and the reinforcing member 58 can be reduced in weight.

Incidentally, in the reinforcing member 58, it suffices for the plate thickness t1 of the outside reinforcing member 71 to be smaller than the plate thicknesses t2 and t3 of the inside reinforcing member 70, and the plate thickness t2 and the plate thickness t3 may be different dimensions. For example, the plate thickness t2 may be made smaller than the plate thickness t3, or the plate thickness t3 may be made smaller than the plate thickness t2.

As illustrated in FIG. 5, as viewed from the side of the vehicle, the collecting portion 57 is located in front of the down frame 19, and the reinforcing member 58 is at a position in front of the down frame 19 and is provided to the collecting portion 57. Therefore, the collecting portion 57 located in front of the down frame 19 can be protected effectively by covering the collecting portion 57 with the reinforcing member 58.

Specifically, as viewed from the side of the vehicle, a front portion of the reinforcing member 58 is located in front of the down frame 19, and a rear portion of the reinforcing member 58 coincides with the down frame 19. It suffices for at least a part of the reinforcing member 58 to be disposed in front of the down frame 19 as viewed from the side of the vehicle, and the whole of the reinforcing member 58 may be disposed in front of the down frame 19.

Figure 11:
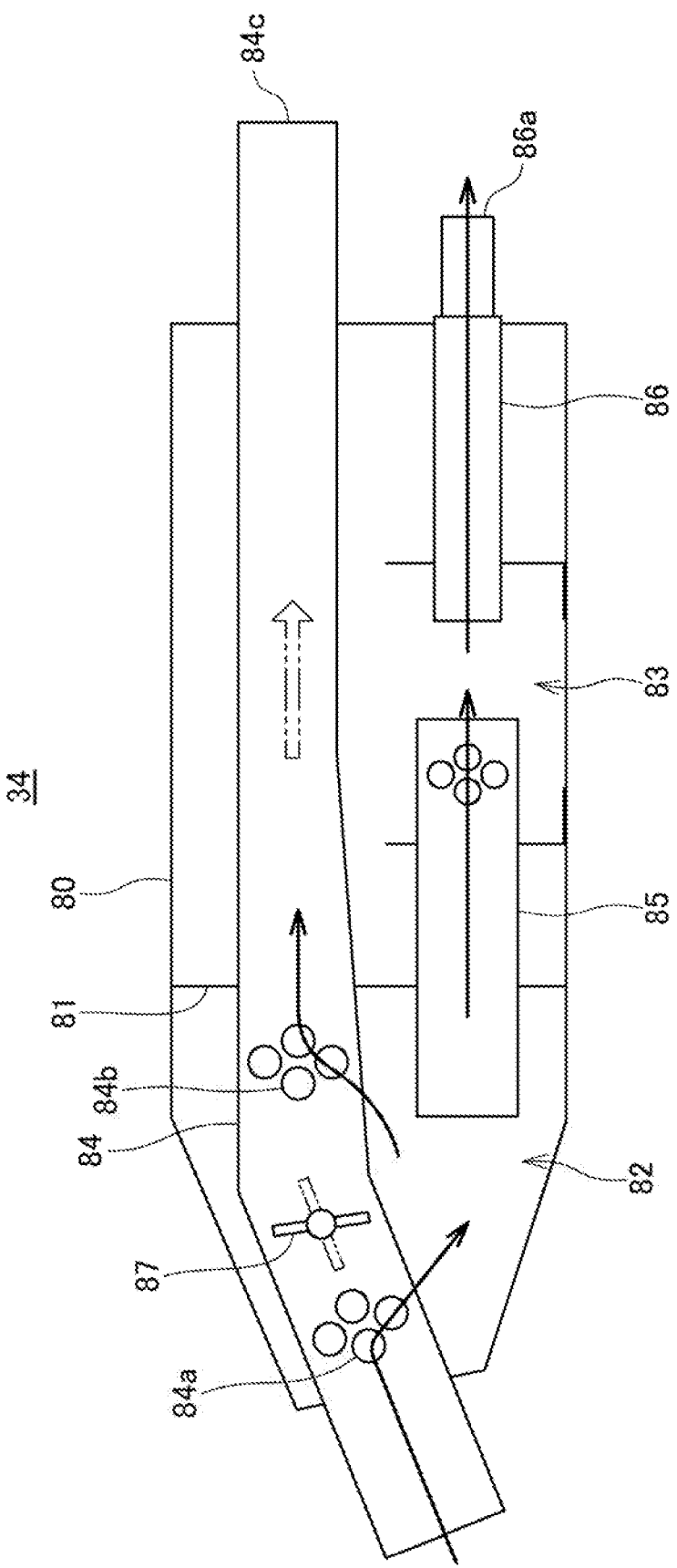
FIG. 11 is a diagram schematically illustrating an internal structure of a muffler.

FIG. 11 is a diagram schematically illustrating an internal structure of the muffler 34.

The muffler 34 includes: a tubular muffler case 80 whose front end and rear end are closed; and a partition wall 81 that partitions the inside of the muffler case 80 into a front part and a rear part. The partition wall 81 demarcates a space within the muffler case 80 into a first expansion chamber 82 and a second expansion chamber 83 in the rear of the first expansion chamber 82.

The muffler 34 includes: a main pipe 84 that penetrates from a front end of the muffler case 80 through the partition wall 81 to a rear end of the muffler case 80; a communication pipe 85 that penetrates the partition wall 81 and thereby makes the first expansion chamber 82 and the second expansion chamber 83 communicate with each other; and a tail pipe 86 that is in the rear of the communication pipe 85, and penetrates the rear end of the muffler case 80 and thereby makes the second expansion chamber 83 communicate with the outside.

The muffler 34 includes an exhaust valve 87 in a part of the main pipe 84 which part passes through the first expansion chamber 82. The exhaust valve 87 is controlled by a control unit of the motorcycle 1, and opens and closes a flow passage of exhaust in the main pipe 84.

The main pipe 84 includes communication ports 84a and 84b in the part located within the first expansion chamber 82, the communication ports 84a and 84b making the main pipe 84 communicate with the first expansion chamber 82. The communication port 84a is disposed upstream of the exhaust valve 87, and the communication port 84b is disposed downstream of the exhaust valve 87.

A front end of the main pipe 84 is connected to a rear end of the downstream side exhaust pipe 53.

As indicated by a solid line in FIG. 11, when the exhaust valve 87 is closed, exhaust that has flowed into the main pipe 84 from the exhaust pipe 33 flows into the first expansion chamber 82 from the communication port 84a.

The exhaust that has flowed into the first expansion chamber 82 is divided into exhaust flowing into the main pipe 84 again from the communication port 84b and exhaust flowing into the second expansion chamber 83 from the communication pipe 85.

The exhaust that has flowed into the main pipe 84 from the communication port 84b is discharged from a muffler exhaust port 84c at a rear end of the main pipe 84 to the outside. The exhaust that has flowed into the second expansion chamber 83 is discharged from a muffler exhaust port 86a at a rear end of the tail pipe 86 to the outside.

As indicated by a phantom line in FIG. 11, when the exhaust valve 87 is opened, most of the exhaust that has flowed into the main pipe 84 from the exhaust pipe 33 flows through the main pipe 84 to the rear, and is discharged from the rear end of the main pipe 84 to the outside.

Figure 12:
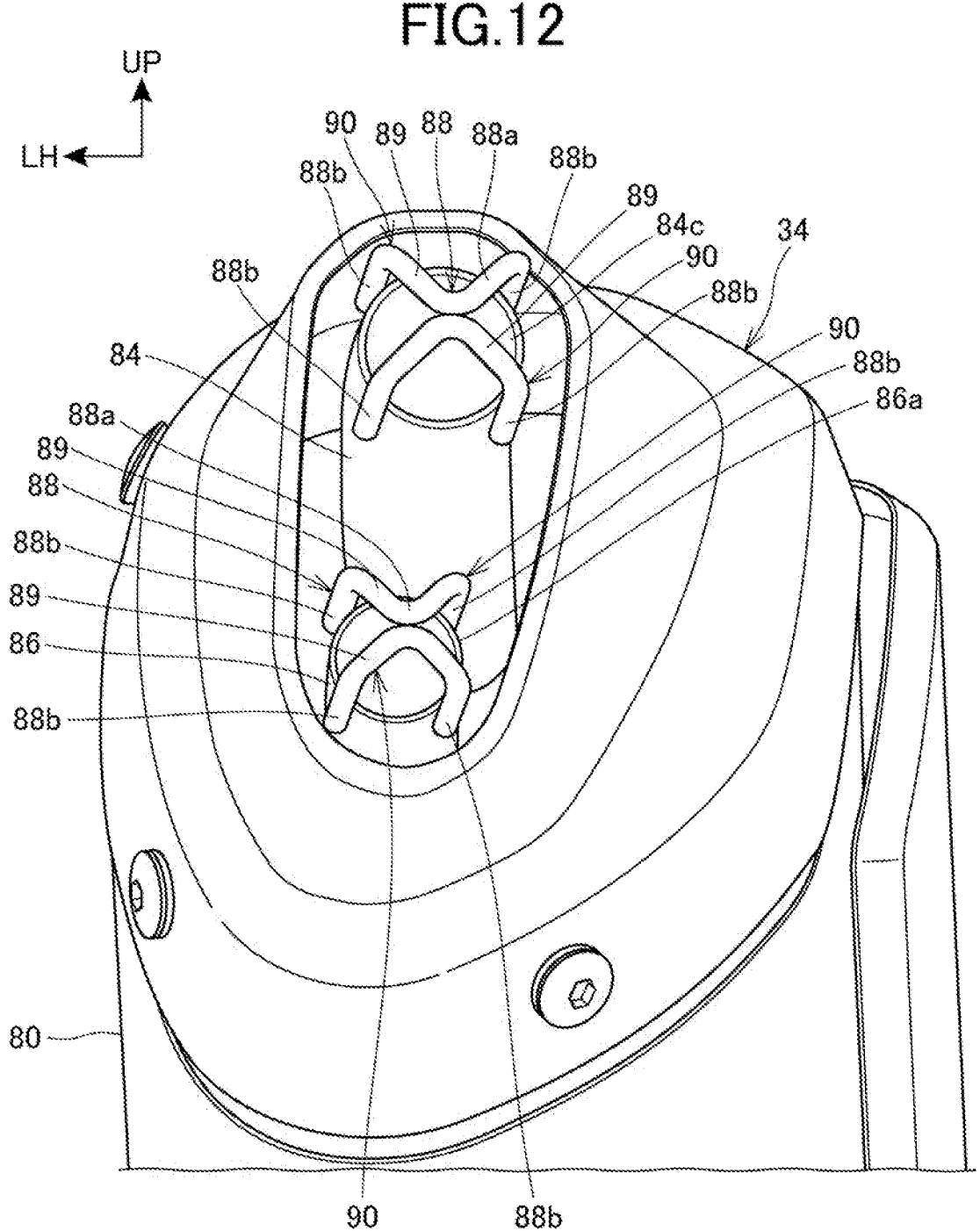
FIG. 12 is a view of a rear end portion of the muffler as viewed from a rear side.
Figure 13:
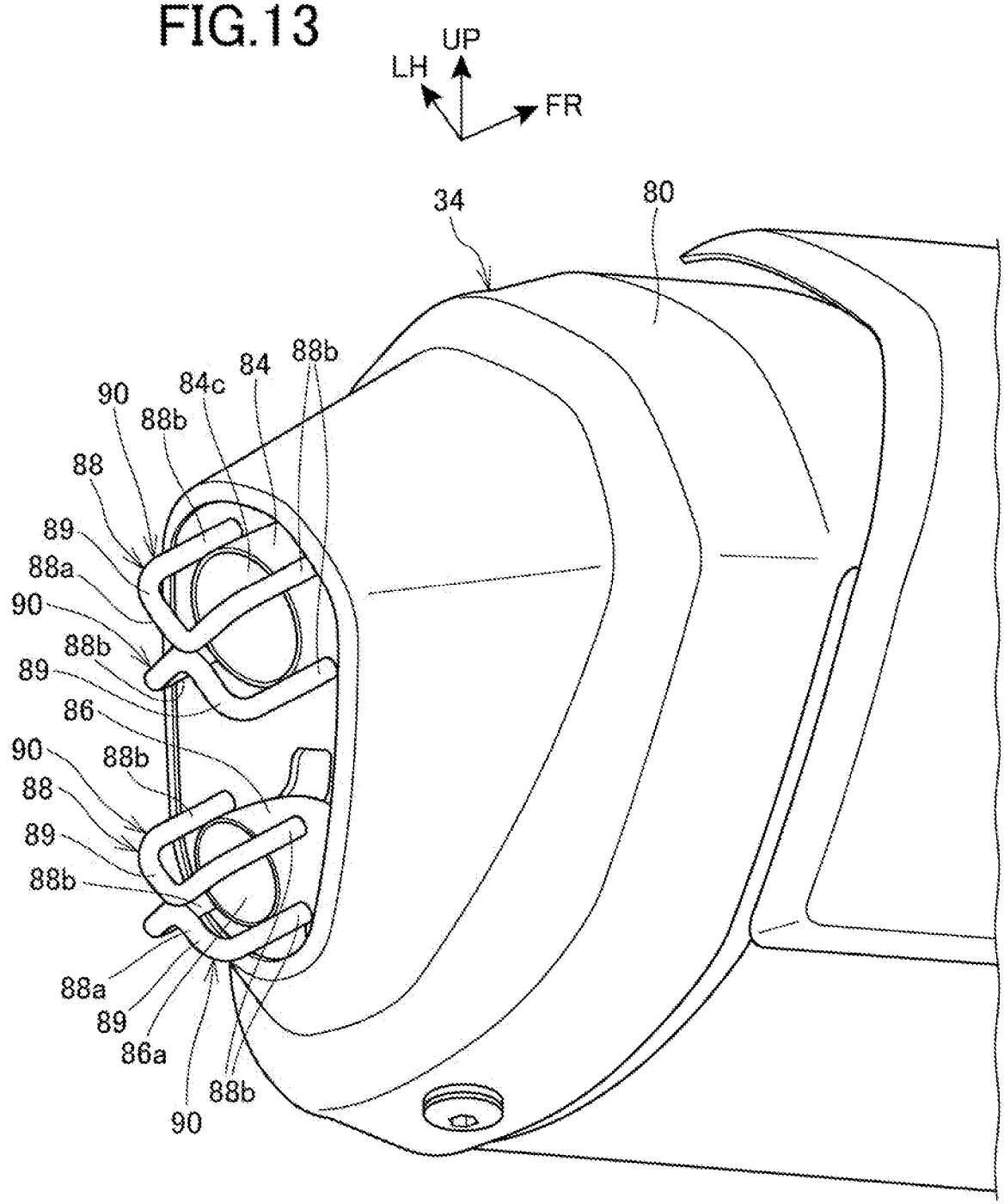
FIG. 13 is a perspective view of the rear end portion of the muffler as viewed sideway from the rear side.

FIG. 12 is a view of a rear end portion of the muffler 34 as viewed from the rear side. FIG. 13 is a perspective view of the rear end portion of the muffler 34 as viewed sideway from the rear side.

Exhaust port covers 88 are respectively attached to the muffler exhaust port 84c and the muffler exhaust port 86a.

The exhaust port covers 88 cover the muffler exhaust ports 84c and 86a from the outside rear.

The exhaust port covers 88 include linear cover portions 88a (linear portions) formed in the shape of a cross and attaching portions 88b extending from respective ends of the crosses of the linear cover portions 88a to outer peripheral portions of the muffler exhaust ports 84c and 86a.

The exhaust port covers 88 are arranged such that centers of the crosses of the linear cover portions 88a substantially coincide with centers of the muffler exhaust ports 84c and 86a. The exhaust port covers 88 cover parts of the muffler exhaust ports 84c and 86a from the downstream side of the exhaust. The linear cover portions 88a radially extend outward in a radial direction from the centers of the muffler exhaust ports 84c and 86a.

The attaching portions 88b are in a linear shape extending in the axial direction of the muffler exhaust ports 84c and 86a. Four attaching portions 88b of each of the exhaust port covers 88 are coupled to the outer peripheral portions of the muffler exhaust ports 84c and 86a.

Incidentally, the exhaust port covers 88 are formed in the shape of a cross by combining two linear bodies 90 each including a bent linear portion 89 bent in a V-shape at an angle of substantially 90° and a pair of attaching portions 88b extending from ends of the V-shape of the bent linear portion 89.

The exhaust discharged from the muffler exhaust ports 84c and 86a is diffused by hitting the exhaust port covers 88. Thus, the flow rate of the exhaust discharged from the muffler exhaust ports 84c and 86a can be adjusted to an arbitrary flow rate by adjusting the size and attachment state of the exhaust port covers 88.

Figure 14:
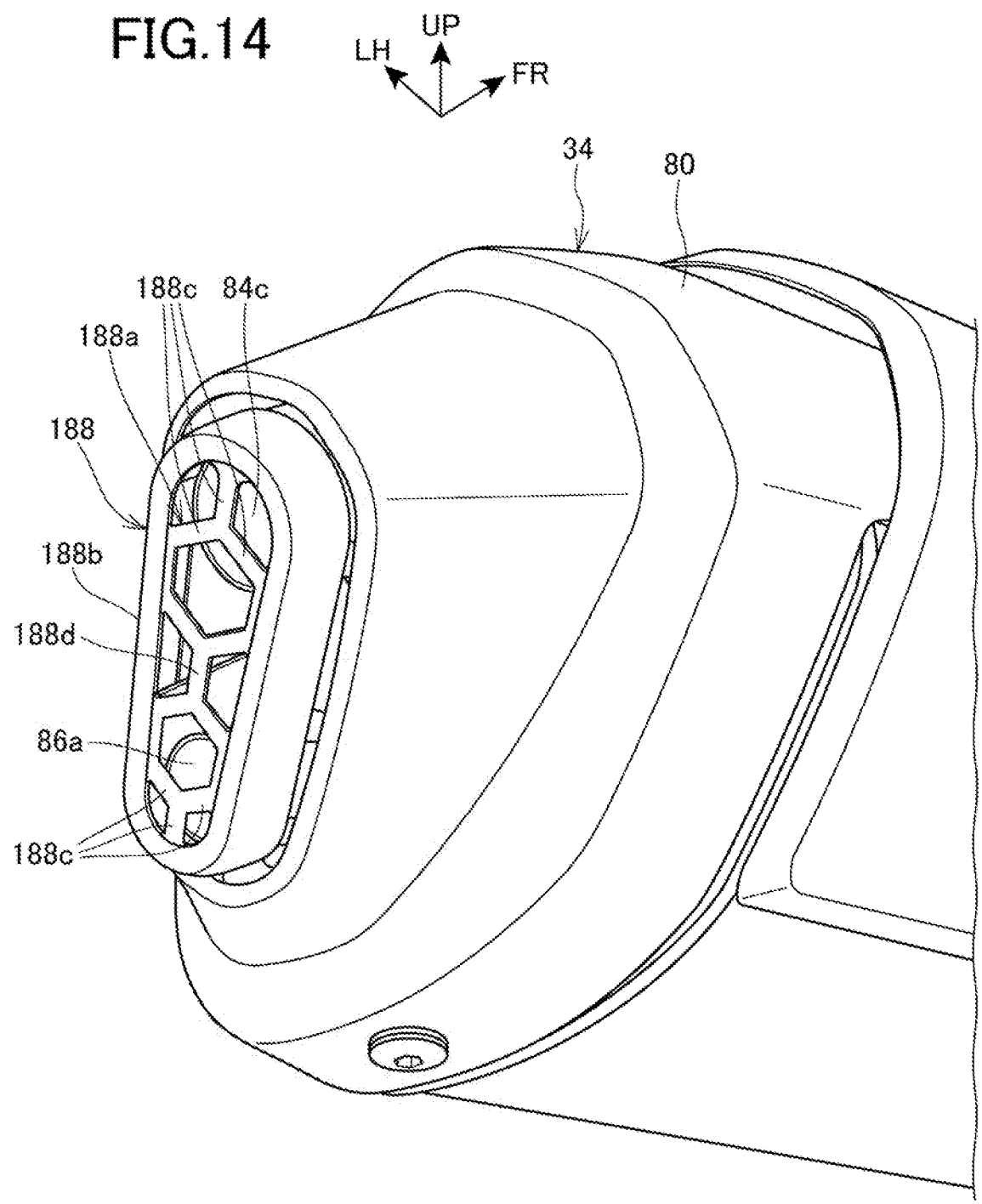
FIG. 14 is a perspective view illustrating a state in which an exhaust port cover different from exhaust port covers is attached to the muffler.

FIG. 14 is a perspective view illustrating a state in which an exhaust port cover 188 different from the exhaust port covers 88 is attached to the muffler 34.

The exhaust port cover 188 includes: a linear cover portion 188a that covers parts of the muffler exhaust ports 84c and 86a from the downstream side of the exhaust; and a frame portion 188b disposed so as to surround an outer peripheral portion of the linear cover portion 188a.

The linear cover portion 188a is supported by the frame portion 188b, and is attached to the muffler 34 via the frame portion 188b.

The linear cover portion 188a includes a plurality of linear portions 188c radially extending outward in a radial direction from the center of each of the muffler exhaust ports 84c and 86a. Specifically, at each of the muffler exhaust ports 84c and 86a, three linear portions 188c are provided, and the linear portions 188c are arranged at intervals of substantially 120° from each other.

The linear portions 188c on the muffler exhaust port 84c side are coupled to the linear portions 188c on the muffler exhaust port 86a side by a linear coupling portion 188d.

The flow rate of the exhaust can be adjusted to an arbitrary flow rate by providing the exhaust port cover 188.

As described above, according to an embodiment to which the present invention is applied, an exhaust structure for a motorcycle 1 includes: an exhaust pipe 33 connected to an engine 11; and a catalyst 52 disposed in the exhaust pipe 33; the exhaust pipe 33 including a catalyst case unit 51 housing the catalyst 52 and an upstream side exhaust pipes 50L and 50R disposed on an upstream side of the catalyst case unit 51; the catalyst case unit 51 having a larger diameter than the upstream side exhaust pipes 50L and 50R; the upstream side exhaust pipes 50L and 50R being connected to the catalyst case unit 51 in a connecting portion 60 located on an upstream side of the catalyst 52 in a flow of exhaust; in the connecting portion 60, axes 50L1 and 50R1 of the upstream side exhaust pipes 50L and 50R and an axis 51a of the catalyst case unit 51 being in substantially right-angled positional relation to each other.

According to this constitution, in the connecting portion 60 in which the upstream side exhaust pipes 50L and 50R are connected to the catalyst case unit 51, the exhaust in the upstream side exhaust pipes 50L and 50R flows into the catalyst case unit 51 in a direction at substantially a right angle to the axis 51a of the catalyst case unit 51. Thus, a disturbance occurs in the flow of the exhaust and the exhaust is distributed on the upstream side of the catalyst 52 in the catalyst case unit 51, so that the exhaust can be fed to the catalyst 52 uniformly.

Here, it suffices for the extent of substantially the right angle between the axes 50L1 and 50R1 of the upstream side exhaust pipes 50L and 50R and the axis 51a of the catalyst case unit 51 to be such an extent as to be able to cause a disturbance in the flow of the exhaust effectively on the upstream side of the catalyst 52. For example, substantially the right angle is in a range of 70° to 110°.

In addition, a plurality of the upstream side exhaust pipes 50L and 50R are connected to the catalyst case unit 51 in the connecting portion 60.

According to this constitution, the exhaust flows into the catalyst case unit 51 in a direction at substantially a right angle to the axis 51a of the catalyst case unit 51 from the plurality of upstream side exhaust pipes 50L and 50R. Thus, a disturbance occurs in the flow of the exhaust on the upstream side of the catalyst 52, so that the exhaust can be fed to the catalyst 52 uniformly.

In addition, the plurality of upstream side exhaust pipes 50L and 50R are arranged alongside and substantially in parallel with each other in the connecting portion 60.

According to this constitution, exhausts flow from the plurality of upstream side exhaust pipes 50L and 50R at substantially a right angle to the axis 51a of the catalyst case unit 51 and substantially in parallel with each other, and flow into the catalyst case unit 51. Thus, a disturbance occurs in the flow of the exhausts on the upstream side of the catalyst 52, so that the exhausts can be fed to the catalyst 52 uniformly. In addition, the plurality of upstream side exhaust pipes 50L and 50R can be arranged compactly.

Further, the plurality of upstream side exhaust pipes 50L and 50R include inward extending pipe portions 61L and 61R extending to an inside of the catalyst case unit 51 in the connecting portion 60, and as viewed in an axial direction of the axis 51a of the catalyst case unit 51, the inward extending pipe portion 61R of the upstream side exhaust pipe 50R having a shorter distance of distances between the axes 50L1 and 50R1 of the upstream side exhaust pipes 50L and 50R and an inner surface 51d of the catalyst case unit 51 in a direction orthogonal to the axes 50L1 and 50R1 of the upstream side exhaust pipes 50L and 50R extends deeper into the inside of the catalyst case unit 51 than the upstream side exhaust pipe 50L having a longer distance.

According to this constitution, an exhaust G1 that enters the inside of the catalyst case unit 51 from the upstream side exhaust pipe 50R having the shorter distance causes a flow rotating along the inner circumferential surface of the catalyst case unit 51, and an exhaust G2 that enters the inside of the catalyst case unit 51 from the upstream side exhaust pipe 50L having the longer distance merges with the rotating flow. Thus, a disturbance in the flow of the exhausts can be generated efficiently on the upstream side of the catalyst 52, so that the exhausts can be fed to the catalyst 52 uniformly.

In addition, the upstream side exhaust pipes 50L and 50R extend from exhaust ports 31b and 31c of the engine 11 to the catalyst case unit 51, and the catalyst case unit 51 is disposed outward in a vehicle width direction with respect to the exhaust ports 31b and 31c.

According to this constitution, the catalyst case unit 51 is disposed outward in the vehicle width direction with respect to the exhaust ports 31b and 31c. Spaces are therefore secured easily in parts located above and below the exhaust ports 31b and 31c.

In addition, a reinforcing member 58 reinforcing the upstream side exhaust pipes 50L and 50R is provided, the reinforcing member 58 includes an inside reinforcing member 70 located in a position between the plurality of upstream side exhaust pipes 50L and 50R and connecting the plurality of upstream side exhaust pipes 50L and 50R to each other and an outside reinforcing member 71 located outward of the inside reinforcing member 70 and disposed on the upstream side exhaust pipe 50R, and a plate thickness t1 of the outside reinforcing member 71 is smaller than plate thicknesses t2 and t3 of the inside reinforcing member 70.

According to this constitution, the strength of the upstream side exhaust pipes 50L and 50R can be increased effectively by the inside reinforcing member 70 located in a position between the plurality of upstream side exhaust pipes 50L and 50R and connecting the plurality of upstream side exhaust pipes 50L and 50R to each other. In addition, because the plate thickness t1 of the outside reinforcing member 71 disposed outward of the inside reinforcing member 70 is smaller than the plate thicknesses t2 and t3 of the inside reinforcing member 70, a weight reduction can be achieved while the strength of the upstream side exhaust pipes 50L and 50R is increased. Further, because the inside reinforcing member 70 is provided, foreign matter such as grass or the like can be prevented from getting caught between the plurality of upstream side exhaust pipes 50L and 50R, and the exhaust structure is cleaned easily.

In addition, the inside reinforcing member 70 is provided as separate parts, that is, a front side reinforcing member 76 on a front surface side of the upstream side exhaust pipes 50L and 50R in the motorcycle and a rear side reinforcing member 77 on a rear surface side of the upstream side exhaust pipes 50L and 50R.

According to this constitution, the inside reinforcing member 70 is easily provided to the upstream side exhaust pipes 50L and 50R at a time of manufacturing.

In addition, the plurality of upstream side exhaust pipes 50L and 50R include downward extending portions 55L and 55R extending downward from the exhaust ports 31b and 31c and sideward extending portions 56L and 56R extending outward in the vehicle width direction from lower ends of the downward extending portions 55L and 55R, and the sideward extending portions 56L and 56R are connected to the catalyst case unit 51 in the connecting portion 60.

According to this constitution, because the sideward extending portions 56L and 56R extending outward in the vehicle width direction from the lower ends of the downward extending portions 55L and 55R are connected to the catalyst case unit 51 in the connecting portion 60, the exhaust structure can be made compact in a vertical direction in the vicinity of the catalyst case unit 51.

In addition, the catalyst case unit 51 is disposed rearwardly downward as viewed from a side of the vehicle, and the connecting portion 60 is provided to a front end portion 51b of the catalyst case unit 51.

According to this constitution, because the catalyst case unit 51 is disposed rearwardly downward as viewed from the side of the vehicle, a front portion of the catalyst case unit 51 can be disposed at a high position, and the front portion of the catalyst case unit 51 can be disposed at a position distant from a road surface, so that a road clearance of the motorcycle 1 can be secured. In addition, the lengths of the upstream side exhaust pipes 50L and 50R can be shortened.

Further, a vehicle body frame 10 of the motorcycle 1 includes a head pipe 16 supporting a steering system 12, a down frame 19 extending downward from the head pipe 16, and a lower frame 20 extending rearward below the engine 11 from the down frame 19, the upstream side exhaust pipes 50L and 50R extend downward from the exhaust ports 31b and 31c in a front surface of the engine 11 while passing a side of the down frame 19, and the connecting portion 60 is disposed in front of the down frame 19 and the lower frame 20 as viewed from a side of the vehicle.

According to this constitution, because the connecting portion 60 is disposed in front of the down frame 19 and the lower frame 20 as viewed from the side of the vehicle, the upstream side exhaust pipes 50L and 50R are easily extended outward in the vehicle width direction, and the axes 50L1 and 50R1 of the upstream side exhaust pipes 50L and 50R and the axis 51a of the catalyst case unit 51 are easily arranged at substantially a right angle to each other. In addition, the upstream side exhaust pipes 50L and 50R can be shortened.

In addition, the axis 51a of the catalyst case unit 51 extends in a forward-rearward direction of the vehicle, and in a case where the axis 51a of the catalyst case unit 51 and the axes 50L1 and 50R1 of the upstream side exhaust pipes 50L and 50R are viewed in a direction orthogonal to the axis 51a from above the catalyst case unit 51, the axes 50L1 and 50R1 of the upstream side exhaust pipes 50L and 50R and the axis 51a of the catalyst case unit 51 are in substantially right-angled positional relation to each other.

According to this constitution, the connecting portion 60 and the catalyst case unit 51 can be arranged compactly.

In addition, conventionally, an exhaust structure for a saddle riding vehicle is known which includes a plurality of exhaust pipes extending from exhaust ports of an internal combustion engine and a reinforcing member coupling the exhaust pipes to each other and reinforcing the exhaust pipes (see Patent Document 2 (Japanese Patent Laid-Open No. Hei 7-224648), for example). In Patent Document 2, the exhaust pipes are passed below the internal combustion engine, and the reinforcing member is also located on the downward side of the engine.

However, in the exhaust structure of Patent Document 2, the exhaust pipes and the reinforcing member are located on the downward side of the internal combustion engine, and therefore it is difficult to secure a large ground clearance of the saddle riding vehicle. In addition, because spaces for arranging parts are limited in the saddle riding vehicle, the exhaust pipes are desired to be reinforced effectively by a simple structure.

It is therefore desired that in the exhaust structure of the saddle riding vehicle, a ground clearance be secured easily and the exhaust pipes be able to be reinforced effectively by a simple structure.

According to an embodiment to which the present invention is applied, a plurality of the upstream side exhaust pipes 50L and 50R are provided so as to extend from exhaust ports 31b and 31c of the engine 11, a reinforcing member 58 reinforcing the upstream side exhaust pipes 50L and 50R is provided, a collecting portion 57 in which the plurality of upstream side exhaust pipes 50L and 50R collect together is disposed outward in a vehicle width direction with respect to the exhaust ports 31b and 31c, the reinforcing member 58 is provided to the collecting portion 57, the reinforcing member 58 includes an inside reinforcing member 70 located in a position between the plurality of upstream side exhaust pipes 50L and 50R and connecting the plurality of upstream side exhaust pipes 50L and 50R to each other and an outside reinforcing member 71 located in a position outward of the inside reinforcing member 70 and disposed on the upstream side exhaust pipe 50R, and a plate thickness t1 of the outside reinforcing member 71 is smaller than plate thicknesses t2 and t3 of the inside reinforcing member 70.

According to this constitution, the collecting portion 57 in which the plurality of upstream side exhaust pipes 50L and 50R collect together and the reinforcing member 58 are arranged outward in the vehicle width direction with respect to the exhaust ports 31b and 31c, and therefore a ground clearance of the motorcycle 1 is easily secured. In addition, the strength of the upstream side exhaust pipes 50L and 50R can be increased by the simple structure of the inside reinforcing member 70 located in a position between the plurality of upstream side exhaust pipes 50L and 50R and connecting the plurality of upstream side exhaust pipes 50L and 50R to each other. In addition, because the plate thickness t1 of the outside reinforcing member 71 disposed outward of the inside reinforcing member 70 is smaller than the plate thicknesses t2 and t3 of the inside reinforcing member 70, a weight reduction can be achieved while the strength of the upstream side exhaust pipes 50L and 50R is increased.

In addition, the inside reinforcing member 70 is provided as separate parts on a front surface side and a rear surface side of the upstream side exhaust pipes 50L and 50R in the motorcycle 1.

According to this constitution, the inside reinforcing member 70 is easily provided to the upstream side exhaust pipes 50L and 50R at a time of manufacturing.

In addition, the collecting portion 57 is connected to the upstream side of the catalyst 52 in the catalyst case unit 51, and the plurality of upstream side exhaust pipes 50L and 50R are arranged alongside each other in the collecting portion 57.

According to this constitution, exhaust flows from the plurality of upstream side exhaust pipes 50L and 50R to the catalyst case unit 51. Thus, the flow of the exhaust can be disturbed in the catalyst case unit 51, and the exhaust can be distributed, so that the exhaust can be fed to the catalyst 52 uniformly. In addition, because the upstream side exhaust pipes 50L and 50R are arranged alongside each other in the collecting portion 57, the upstream side exhaust pipes 50L and 50R can be arranged compactly.

Further, the axes 50L1 and 50R1 of the upstream side exhaust pipes 50L and 50R in the collecting portion 57 are in substantially right-angled positional relation to the axis 51a of the catalyst case unit 51.

According to this constitution, in the collecting portion 57, exhaust in the upstream side exhaust pipes 50L and 50R flows into the catalyst case unit 51 in a direction at substantially a right angle to the axis 51a of the catalyst case unit 51. Thus, a disturbance occurs in the flow of the exhaust and the exhaust is distributed in the catalyst case unit 51, so that the exhaust can be fed to the catalyst 52 uniformly.

In addition, the plurality of upstream side exhaust pipes 50L and 50R include inward extending pipe portions 61L and 61R extending to an inside of the catalyst case unit 51 in the collecting portion 57, and as viewed in an axial direction of the axis 51a of the catalyst case unit 51, the inward extending pipe portion 61R of the upstream side exhaust pipe 50R having a shorter distance of distances between the axes 50L1 and 50R1 of the upstream side exhaust pipes 50L and 50R and an inner surface 51d of the catalyst case unit 51 in a direction orthogonal to the axes 50L1 and 50R1 of the upstream side exhaust pipes 50L and 50R extends deeper into the inside of the catalyst case unit 51 than the upstream side exhaust pipe 50L having a longer distance.

According to this constitution, an exhaust G1 that enters the inside of the catalyst case unit 51 from the upstream side exhaust pipe 50R having the shorter distance causes a flow rotating along the inner circumferential surface of the catalyst case unit 51, and an exhaust G2 that enters the inside of the catalyst case unit 51 from the upstream side exhaust pipe 50L having the longer distance merges with the rotating flow. Thus, a disturbance in the flow of the exhausts can be generated efficiently on the upstream side of the catalyst 52, so that the exhausts can be fed to the catalyst 52 uniformly.

In addition, a muffler 34 is provided on a downstream side of the upstream side exhaust pipes 50L and 50R, and the muffler 34 includes muffler exhaust ports 84c and 86a discharging exhaust to an outside, and an exhaust port cover 88 covering the muffler exhaust ports 84c and 86a is provided, and the exhaust port cover 88 includes a linear cover portion 88a covering a part of the muffler exhaust ports 84c and 86a.

According to this constitution, the exhaust can be diffused by the linear cover portion 88a of the exhaust port cover 88, and the flow rate of the exhaust can be adjusted.

In addition, the muffler exhaust ports 84c and 86a may be covered by a linear portion 188c of an exhaust port cover 188. According to this constitution, the exhaust can be diffused by the linear portion 188c, and the flow rate of the exhaust can be adjusted.

In addition, the plurality of upstream side exhaust pipes 50L and 50R include downward extending portions 55L and 55R extending downward from the exhaust ports 31b and 31c and sideward extending portions 56L and 56R extending outward in the vehicle width direction from lower ends of the downward extending portions 55L and 55R and connected to the catalyst case unit 51, and the collecting portion 57 is a part in which the plurality of sideward extending portions 56L and 56R collect together.

According to this constitution, because the sideward extending portions 56L and 56R extending outward in the vehicle width direction from the lower ends of the downward extending portions 55L and 55R are connected to the catalyst case unit 51 in the collecting portion 57, the exhaust structure can be made compact in a vertical direction in the vicinity of the catalyst case unit 51.

In addition, the catalyst case unit 51 is disposed rearwardly downward as viewed from a side of the vehicle, and the collecting portion 57 is connected to a front end portion 51b of the catalyst case unit 51.

According to this constitution, because the catalyst case unit 51 is disposed rearwardly downward as viewed from the side of the vehicle, a front portion of the catalyst case unit 51 can be disposed at a high position, and the front portion of the catalyst case unit 51 can be disposed at a position distant from a road surface. In addition, the lengths of the upstream side exhaust pipes 50L and 50R can be shortened.

In addition, a vehicle body frame 10 of the motorcycle 1 includes a head pipe 16 supporting a steering system 12, a down frame 19 extending downward from the head pipe 16, and a lower frame 20 extending rearward below the engine 11 from the down frame 19, and the reinforcing member 58 is provided to the upstream side exhaust pipes 50L and 50R and provided in a position in front of the down frame 19 and the lower frame 20 as viewed from a side of the vehicle.

According to this constitution, the upstream side exhaust pipes 50L and 50R in a position in front of the down frame 19 and the lower frame 20 can be protected effectively by the reinforcing member 58.

It is to be noted that the foregoing embodiment represents one mode to which the present invention is applied, and the present invention is not limited to the foregoing embodiment.

In the foregoing embodiment, description has been made supposing that the axes 50L1 and 50R1 of the plurality of upstream side exhaust pipes 50L and 50R are in substantially right-angled positional relation to the axis 51a of the catalyst case unit 51. However, the present invention is not limited to this. For example, at least one of the plurality of upstream side exhaust pipes 50L and 50R (only the upstream side exhaust pipe 50L, for example) may be in substantially right-angled positional relation as described above. In addition, only one upstream side exhaust pipe may be provided, and the upstream side exhaust pipe may be set in substantially right-angled positional relation as described above to the axis 51a of the catalyst case unit 51.

In addition, in the foregoing embodiment, description has been made supposing that the plurality of upstream side exhaust pipes 50L and 50R are arranged substantially in parallel with and alongside each other in the connecting portion 60. However, without limitation to this, the upstream side exhaust pipe 50L and the upstream side exhaust pipe 50L may be arranged at different angles in the connecting portion 60.

In addition, in the foregoing embodiment, description has been made supposing that the outside reinforcing member 71 is provided to the upstream side exhaust pipe 50R. However, the present invention is not limited to this. For example, the outside reinforcing member may be provided to both of the upstream side exhaust pipes 50L and 50R or only the upstream side exhaust pipe 50L.

In the foregoing embodiment, description has been made by taking the motorcycle 1 as an example of a saddle riding vehicle. However, the present invention is not limited to this, but the present invention is applicable to three-wheeled saddle riding vehicles having two front wheels or two rear wheels and saddle riding vehicles having four wheels or more.

DESCRIPTION OF REFERENCE SYMBOLS

1 Motorcycle (saddle riding vehicle)
10 Vehicle body frame
11 Engine (internal combustion engine)
12 Steering system
16 Head pipe
19 Down frame
20 Lower frame
31b, 31c Exhaust port
33 Exhaust pipe
34 Muffler
50L, 50R Upstream side exhaust pipe
50L1, 50R1 Axis (axis of the upstream side exhaust pipe)
51 Catalyst case unit
51a Axis (axis of the catalyst case unit)
51b Front end portion
51d Inner surface
52 Catalyst
55L, 55R Downward extending portion
56L, 56R Sideward extending portion
57 Collecting portion
58 Reinforcing member
60 Connecting portion
61L, 61R Inward extending pipe portion
70 Inside reinforcing member
71 Outside reinforcing member
84c, 86a Muffler exhaust port
88, 188 Exhaust port cover
88a Linear cover portion (linear portion)
188c Linear portion
t1 Plate thickness (plate thickness of the outside reinforcing member)
t2, t3 Plate thickness (plate thickness of the inside reinforcing member)

The invention claimed is:

1. An exhaust structure for a saddle riding vehicle, the exhaust structure comprising:
    an exhaust pipe connected to an internal combustion engine; and
    a catalyst disposed in the exhaust pipe;
    the exhaust pipe including a catalyst case unit housing the catalyst and an upstream side exhaust pipe disposed on an upstream side of the catalyst case unit;
    the catalyst case unit having a larger diameter than the upstream side exhaust pipe;
    the upstream side exhaust pipe being connected to the catalyst case unit in a connecting portion located on an upstream side of the catalyst in a flow of exhaust;
    in the connecting portion, an axis of the upstream side exhaust pipe and an axis of the catalyst case unit being in substantially right-angled positional relation to each other;
    a plurality of the upstream side exhaust pipes are connected to the catalyst case unit in the connecting portion;
    the plurality of upstream side exhaust pipes are arranged alongside and substantially in parallel with each other in the connecting portion;
    the plurality of upstream side exhaust pipes include inward extending pipe portions extending to an inside of the catalyst case unit in the connecting portion, and as viewed in an axial direction of the axis of the catalyst case unit, the inward extending pipe portion of the upstream side exhaust pipe having a shorter distance of distances between the axes of the upstream side exhaust pipes and an inner surface of the catalyst case unit in a direction orthogonal to the axes of the upstream side exhaust pipes extends deeper into the inside of the catalyst case unit than the upstream side exhaust pipe having a longer distance.

2. The exhaust structure for a saddle riding vehicle according to claim 1, wherein
    the upstream side exhaust pipe extends from an exhaust port of the internal combustion engine to the catalyst case unit, and
    the catalyst case unit is disposed outward in a vehicle width direction with respect to the exhaust port.

3. The exhaust structure for a saddle riding vehicle according to claim 1, wherein
    a reinforcing member reinforcing the upstream side exhaust pipe is provided,
    the reinforcing member includes an inside reinforcing member located in a position between the plurality of upstream side exhaust pipes and connecting the plurality of upstream side exhaust pipes to each other and an outside reinforcing member located outward of the inside reinforcing member and disposed on the upstream side exhaust pipe, and
    a plate thickness of the outside reinforcing member is smaller than a plate thickness of the inside reinforcing member.

4. The exhaust structure for a saddle riding vehicle according to claim 3, wherein
    the inside reinforcing member is provided as separate parts on a front surface side and a rear surface side of the upstream side exhaust pipe in the saddle riding vehicle.

5. The exhaust structure for a saddle riding vehicle according to claim 2, wherein
    the upstream side exhaust pipe includes a downward extending portion extending downward from the exhaust port and a sideward extending portion extending outward in the vehicle width direction from a lower end of the downward extending portion, and
    the sideward extending portion is connected to the catalyst case unit in the connecting portion.

6. The exhaust structure for a saddle riding vehicle according to claim 5, wherein
    the catalyst case unit is disposed rearwardly downward as viewed from a side of the vehicle, and the connecting portion is provided to a front end portion of the catalyst case unit.

7. The exhaust structure for a saddle riding vehicle according to claim 5, wherein
    a vehicle body frame of the saddle riding vehicle includes a head pipe supporting a steering system, a down frame extending downward from the head pipe, and a lower frame extending rearward below the internal combustion engine from the down frame,
    the upstream side exhaust pipe extends downward from the exhaust port in a front surface of the internal combustion engine while passing a side of the down frame, and
    at least a part of the connecting portion is disposed in front of the down frame and the lower frame as viewed from a side of the vehicle.

8. The exhaust structure for a saddle riding vehicle according to claim 1, wherein the axis of the catalyst case unit extends in a forward-rearward direction of the vehicle, and in a case where the axis of the catalyst case unit and the axis of the upstream side exhaust pipe are viewed in a direction orthogonal to the axis from above the catalyst case unit, the axis of the upstream side exhaust pipe and the axis of the catalyst case unit are in substantially right-angled positional relation to each other.

9. An exhaust structure for a saddle riding vehicle, the exhaust structure comprising:

an exhaust pipe connected to an internal combustion engine; and a catalyst disposed in the exhaust pipe;

the exhaust pipe including a catalyst case unit housing the catalyst and an upstream side exhaust pipe disposed on an upstream side of the catalyst case unit;

the catalyst case unit having a larger diameter than the upstream side exhaust pipe;

the upstream side exhaust pipe being connected to the catalyst case unit in a connecting portion located on an upstream side of the catalyst in a flow of exhaust;

in the connecting portion, an axis of the upstream side exhaust pipe and an axis of the catalyst case unit being in substantially right-angled positional relation to each other;

a plurality of the upstream side exhaust pipes are provided so as to extend from exhaust ports of the internal combustion engine, a reinforcing member reinforcing the upstream side exhaust pipes is provided, a collecting portion in which the plurality of upstream side exhaust pipes collect together is disposed outward in a vehicle width direction with respect to the exhaust ports, the reinforcing member is provided to the collecting portion, the reinforcing member includes an inside reinforcing member located in a position between the plurality of upstream side exhaust pipes and connecting the plurality of upstream side exhaust pipes to each other and an outside reinforcing member located in a position outward of the inside reinforcing member and disposed on the upstream side exhaust pipe, and a plate thickness of the outside reinforcing member is smaller than a plate thickness of the inside reinforcing member.

10. The exhaust structure for a saddle riding vehicle according to claim 9, wherein the inside reinforcing member is provided as separate parts on a front surface side and a rear surface side of the upstream side exhaust pipes in the saddle riding vehicle.

11. The exhaust structure for a saddle riding vehicle according to claim 9, wherein the collecting portion is connected to the upstream side of the catalyst in the catalyst case unit, and the plurality of upstream side exhaust pipes are arranged alongside each other in the collecting portion.

12. The exhaust structure for a saddle riding vehicle according to claim 11, wherein axes of the upstream side exhaust pipes in the collecting portion are in substantially right-angled positional relation to the axis of the catalyst case unit.

13. The exhaust structure for a saddle riding vehicle according to claim 12, wherein the plurality of upstream side exhaust pipes include inward extending pipe portions extending to an inside of the catalyst case unit in the collecting portion, and as viewed in an axial direction of the axis of the catalyst case unit, the inward extending pipe portion of the upstream side exhaust pipe having a shorter distance of distances between the axes of the upstream side exhaust pipes and an inner surface of the catalyst case unit in a direction orthogonal to the axes of the upstream side exhaust pipes extends deeper into the inside of the catalyst case unit than the upstream side exhaust pipe having a longer distance.

14. The exhaust structure for a saddle riding vehicle according to claim 9, wherein a muffler is provided on a downstream side of the upstream side exhaust pipes, and the muffler includes a muffler exhaust port discharging exhaust to an outside, and an exhaust port cover covering the muffler exhaust port is provided, and the exhaust port cover includes a linear portion covering a part of the muffler exhaust port.

15. The exhaust structure for a saddle riding vehicle according to claim 11, wherein the plurality of upstream side exhaust pipes include downward extending portions extending downward from the exhaust ports and sideward extending portions extending outward in the vehicle width direction from lower ends of the downward extending portions and connected to the catalyst case unit, and the collecting portion is a part in which the plurality of sideward extending portions collect together.

16. The exhaust structure for a saddle riding vehicle according to claim 15, wherein the catalyst case unit is disposed rearwardly downward as viewed from a side of the vehicle, and the collecting portion is connected to a front end portion of the catalyst case unit.

17. The exhaust structure for a saddle riding vehicle according to claim 9, wherein a vehicle body frame of the saddle riding vehicle includes a head pipe supporting a steering system, a down frame extending downward from the head pipe, and a lower frame extending rearward below the internal combustion engine from the down frame, and the reinforcing member is provided to the upstream side exhaust pipes and provided in a position in front of the down frame and the lower frame as viewed from a side of the vehicle.

18. An exhaust structure for a saddle riding vehicle, the exhaust structure comprising:

an exhaust pipe connected to an internal combustion engine; and a catalyst disposed in the exhaust pipe;

the exhaust pipe including a catalyst case unit housing the catalyst and an upstream side exhaust pipe disposed on an upstream side of the catalyst case unit;

the catalyst case unit having a larger diameter than the upstream side exhaust pipe;

the upstream side exhaust pipe being connected to the catalyst case unit in a connecting portion located on an upstream side of the catalyst in a flow of exhaust;

in the connecting portion, an axis of the upstream side exhaust pipe and an axis of the catalyst case unit being in substantially right-angled positional relation to each other;

a plurality of the upstream side exhaust pipes are connected to the catalyst case unit in the connecting portion;
a reinforcing member reinforcing the upstream side exhaust pipe is provided,
the reinforcing member includes an inside reinforcing member located in a position between the plurality of upstream side exhaust pipes and connecting the plurality of upstream side exhaust pipes to each other and an outside reinforcing member located outward of the inside reinforcing member and disposed on the upstream side exhaust pipe, and
a plate thickness of the outside reinforcing member is smaller than a plate thickness of the inside reinforcing member.

* * * * *